Jan. 23, 1968  R. H. STOHLQUIST  3,364,651
PACKAGING APPARATUS
Filed Aug. 23, 1965
11 Sheets-Sheet 1
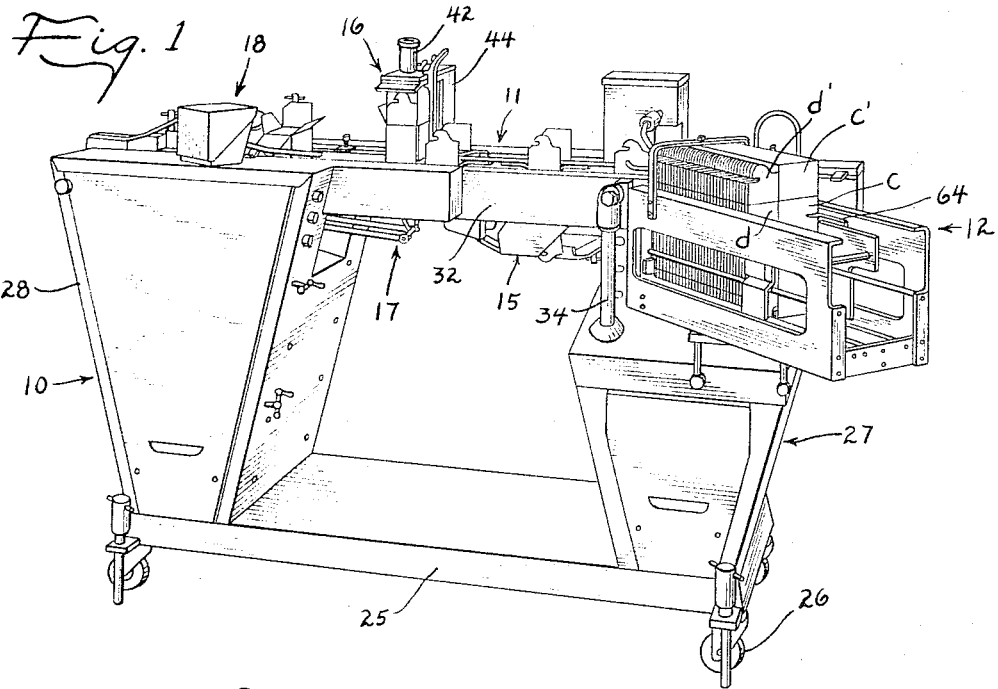
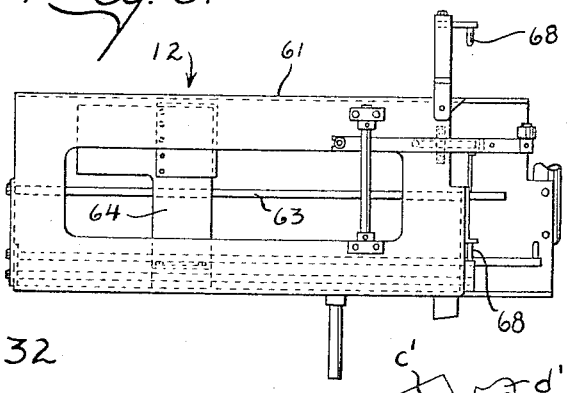
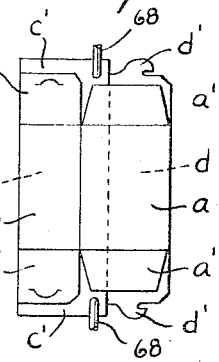
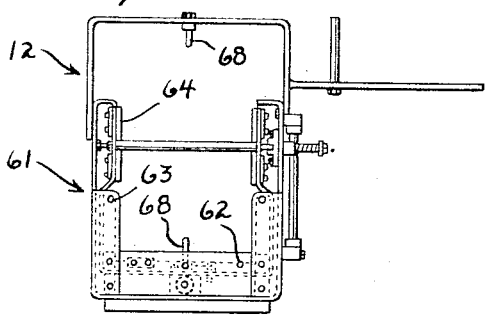
Inventor
Roger H. Stohlquist
By McCanna, Morsbach & Pillote
Attys

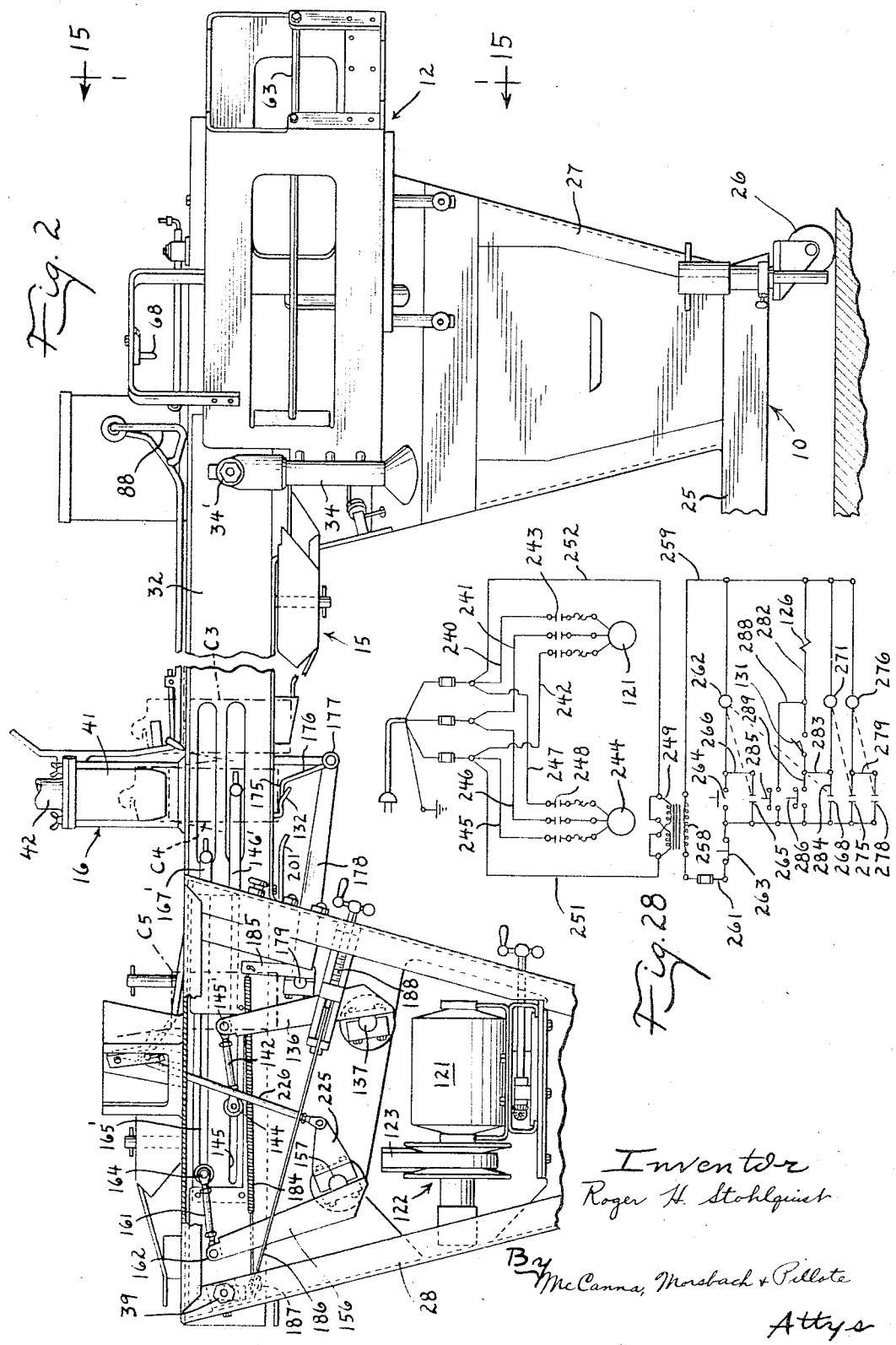

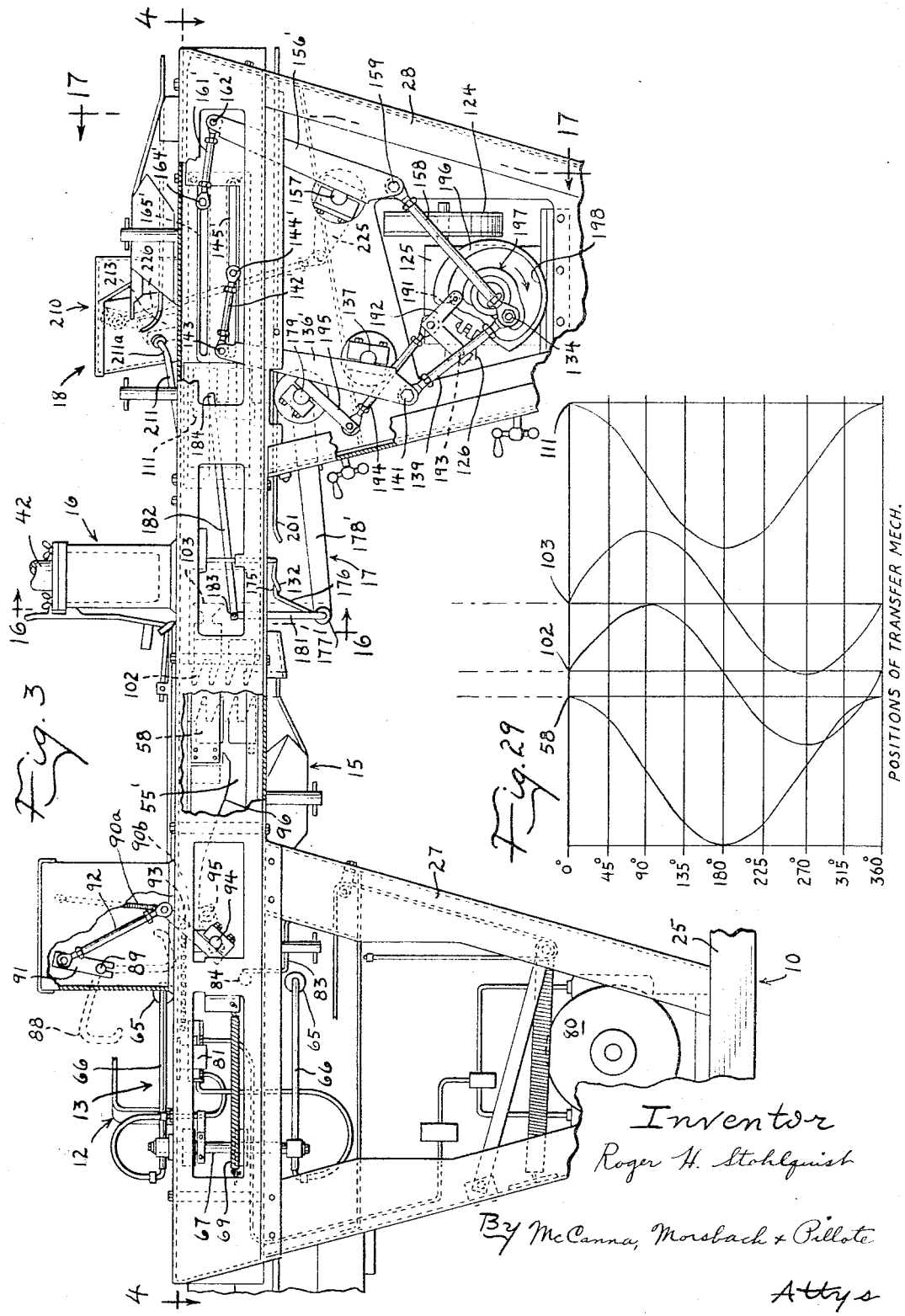

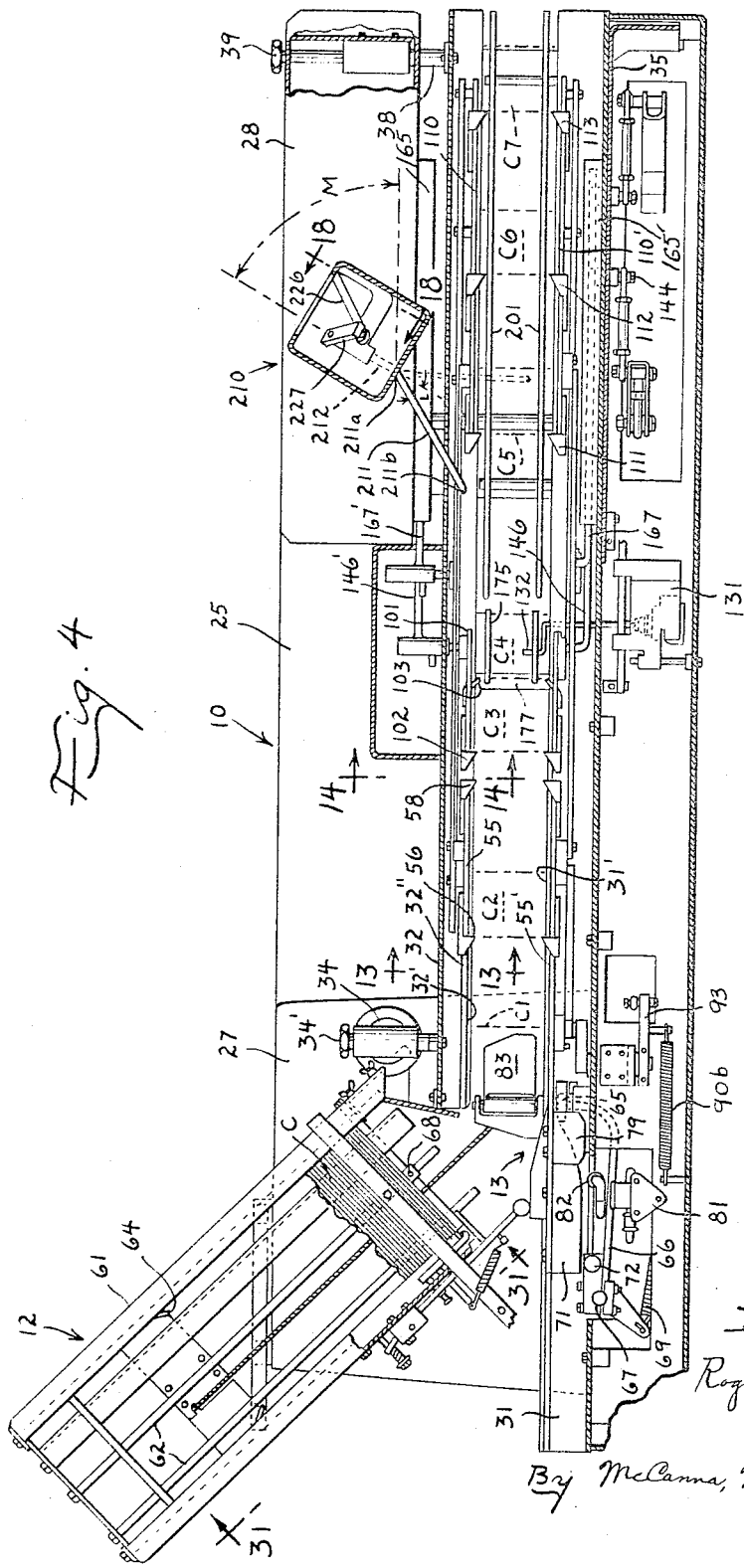

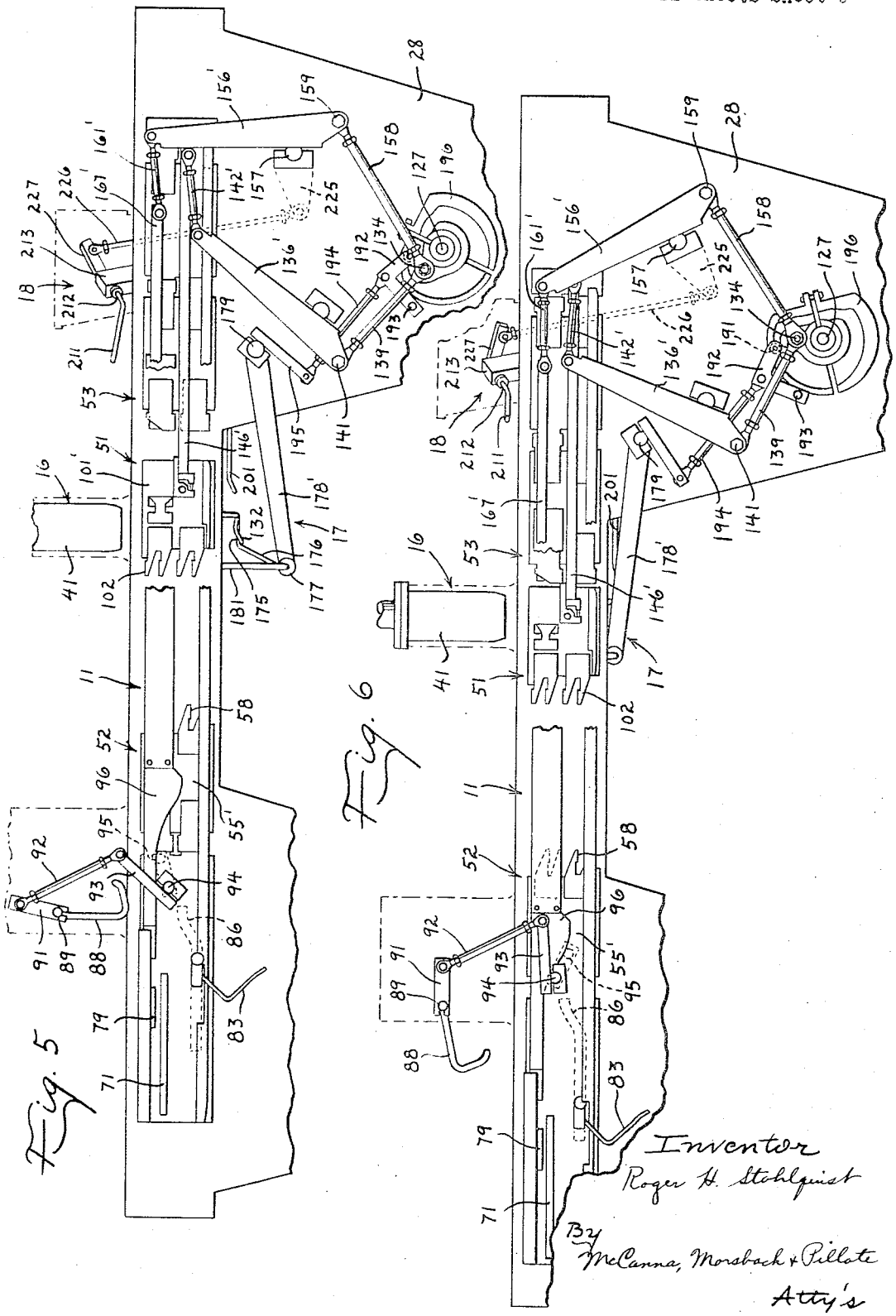

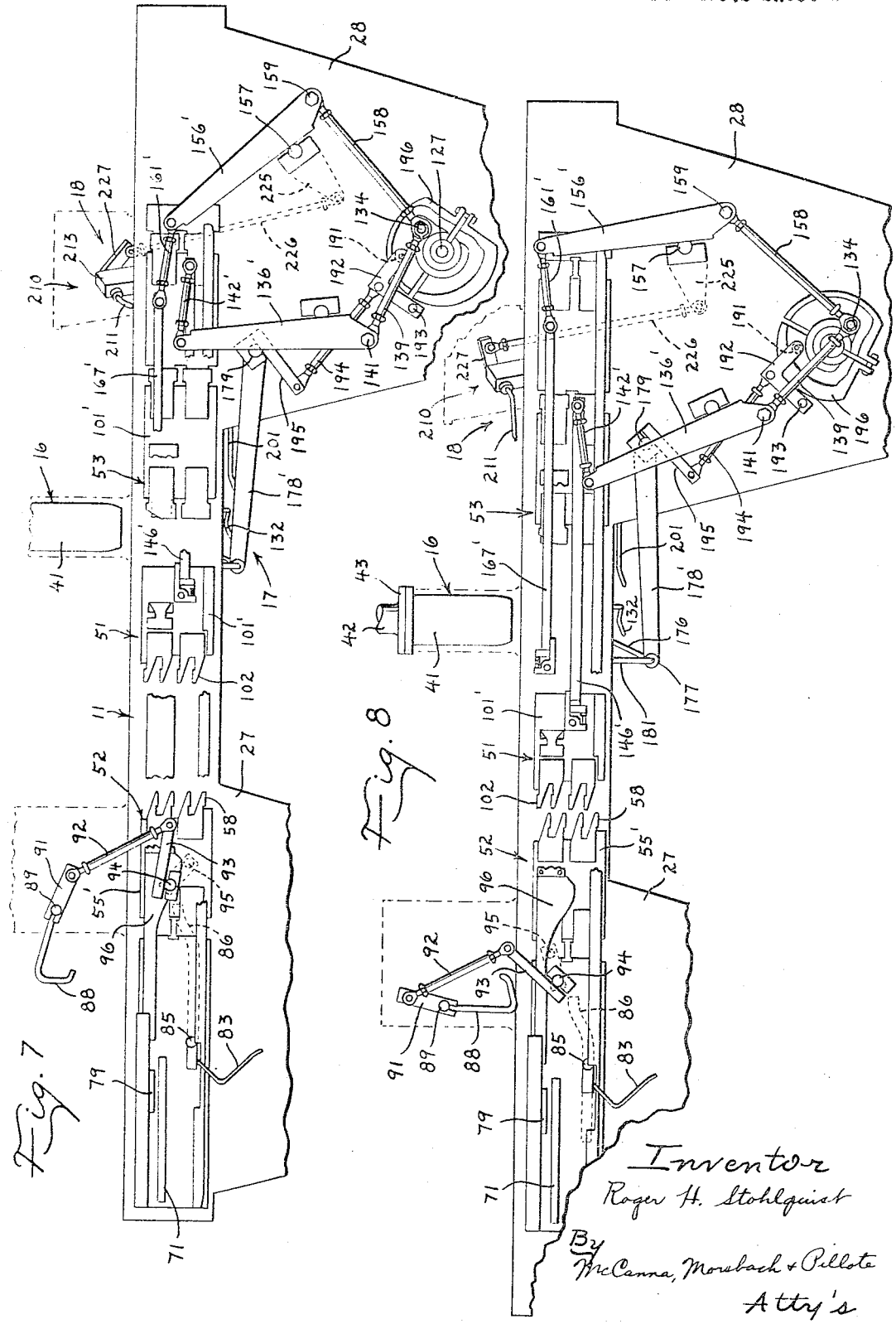

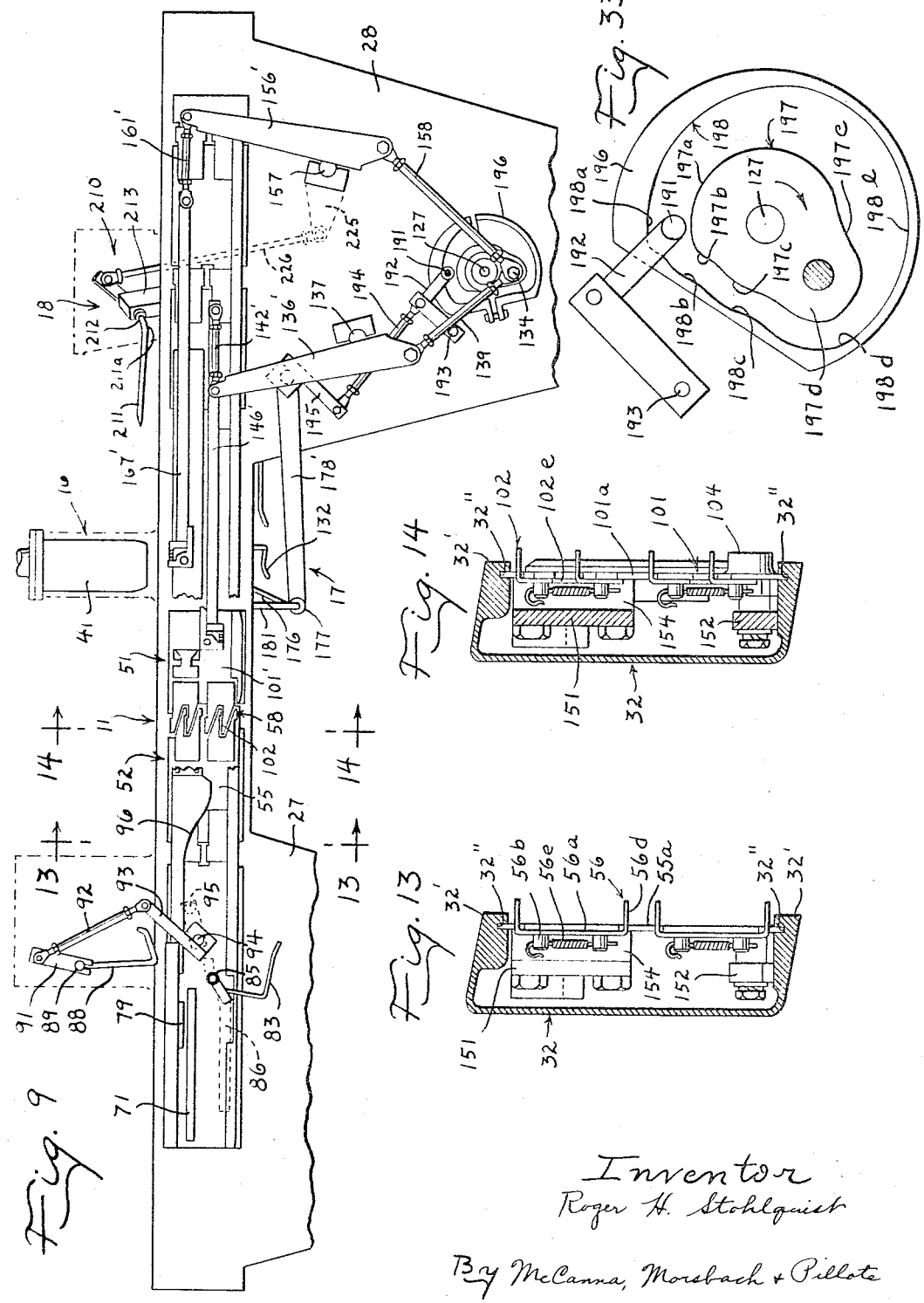

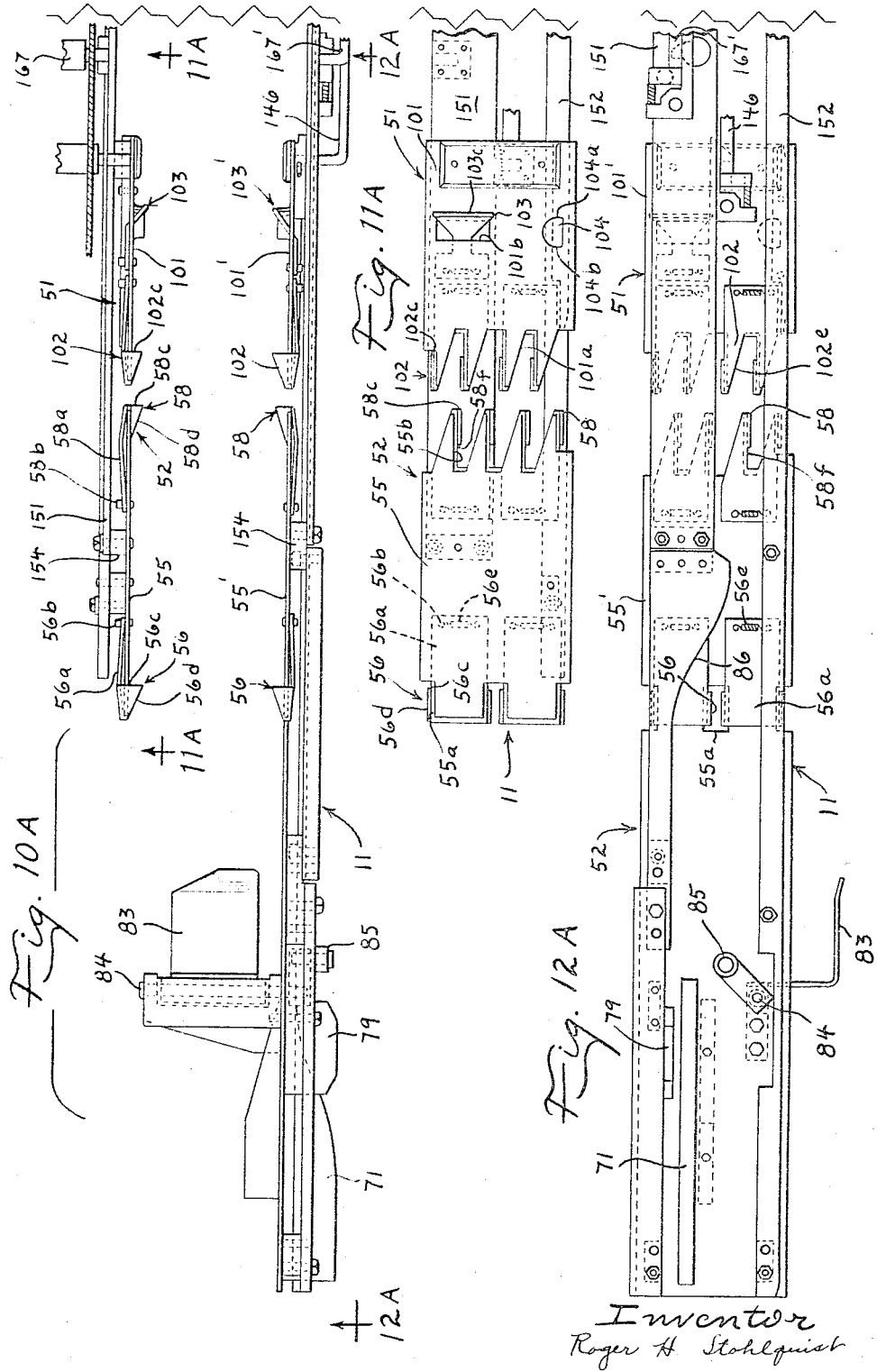

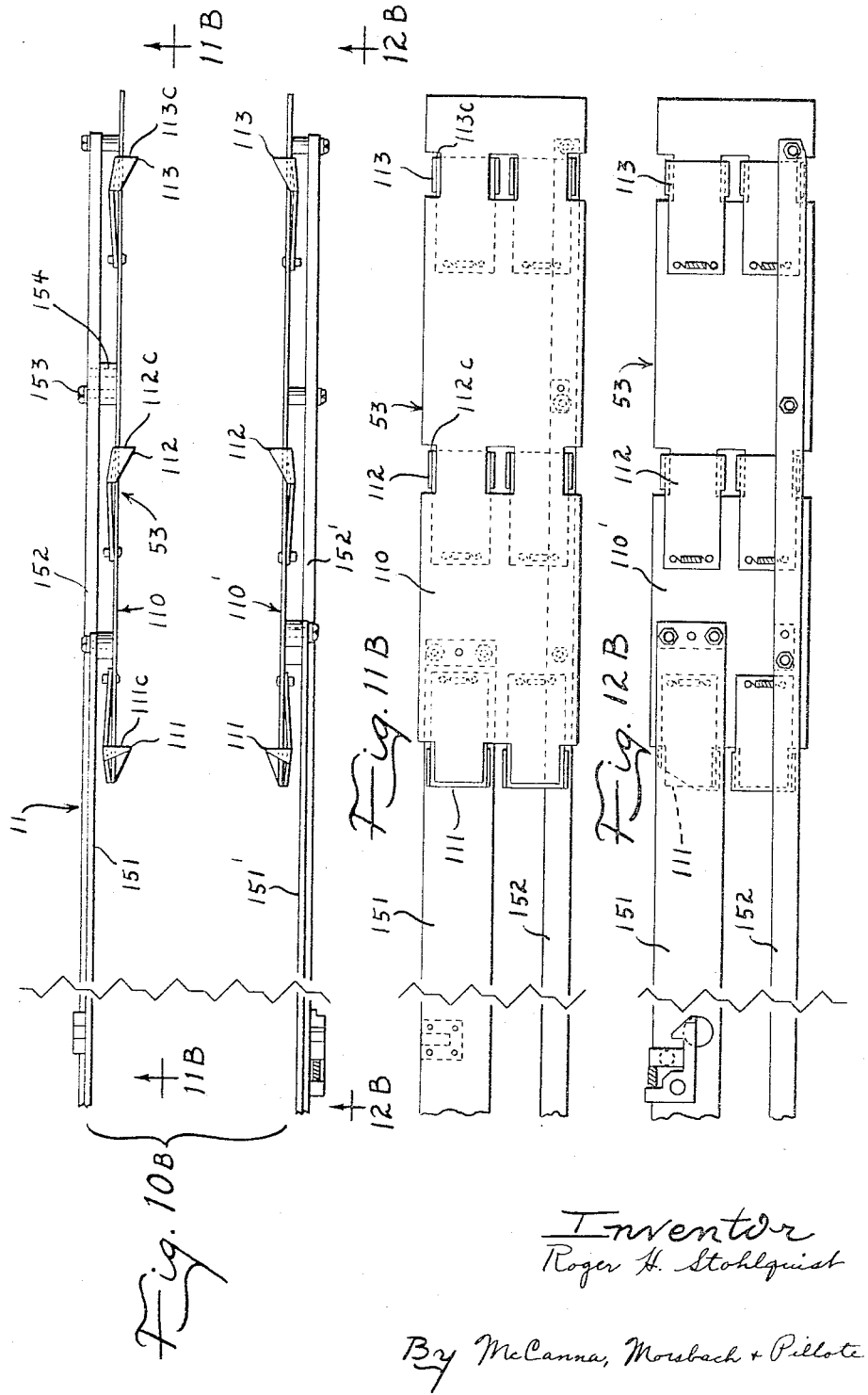

Jan. 23, 1968    R. H. STOHLQUIST    3,364,651
PACKAGING APPARATUS
Filed Aug. 23, 1965                  11 Sheets-Sheet 10
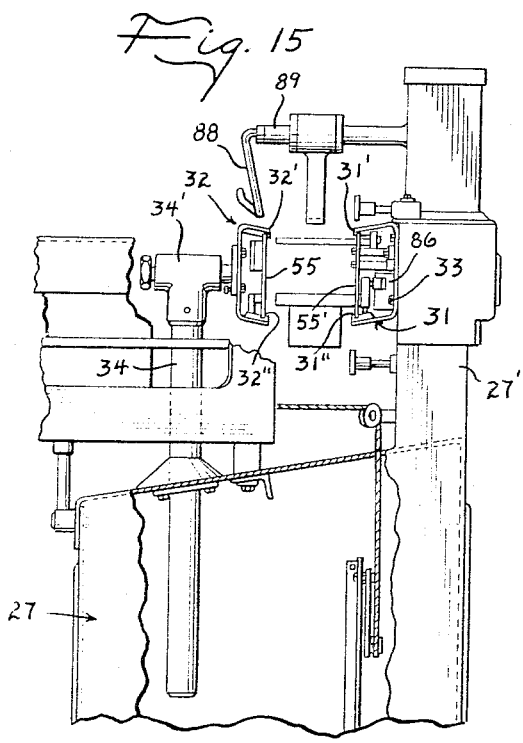
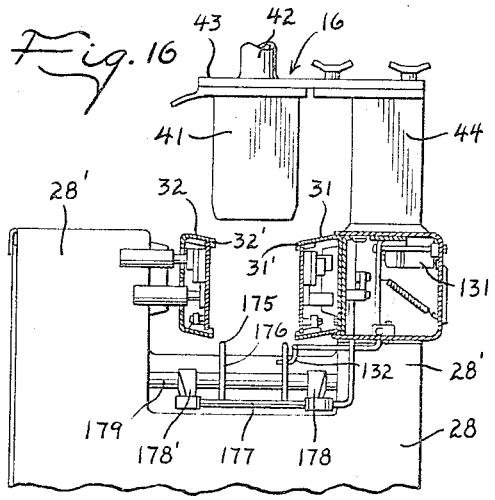
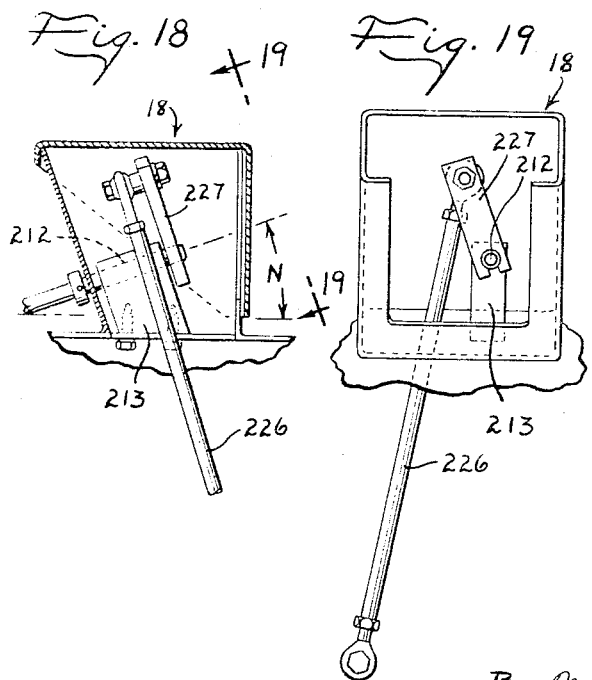
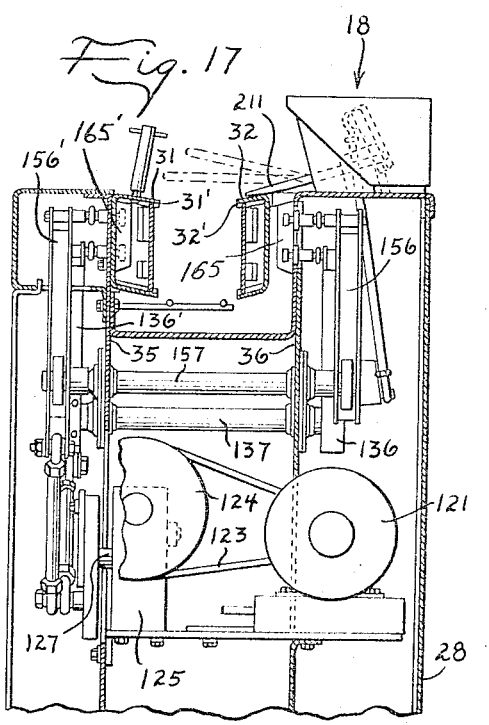
Inventor
Roger H. Stohlquist
By McCanna, Morsbach & Pillote
Attys

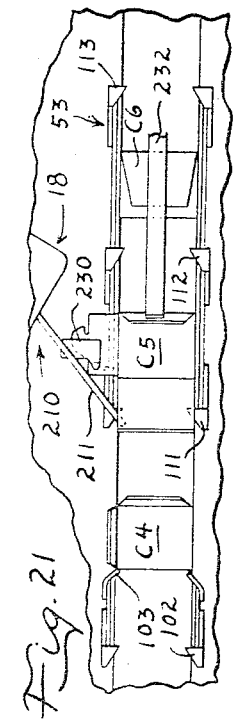
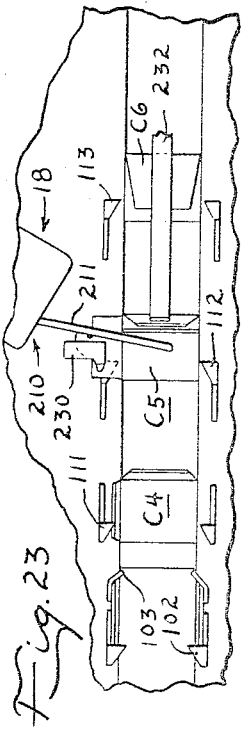
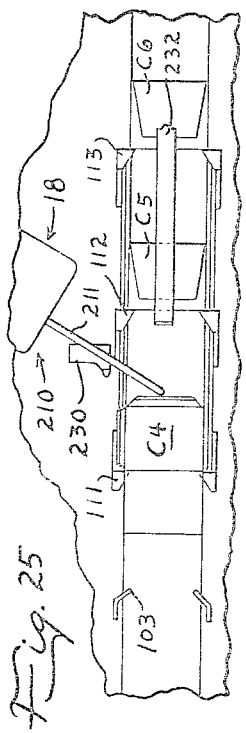
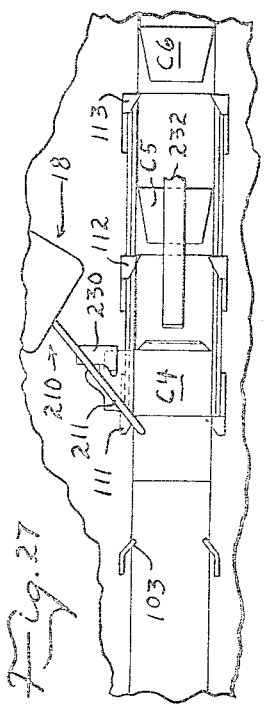
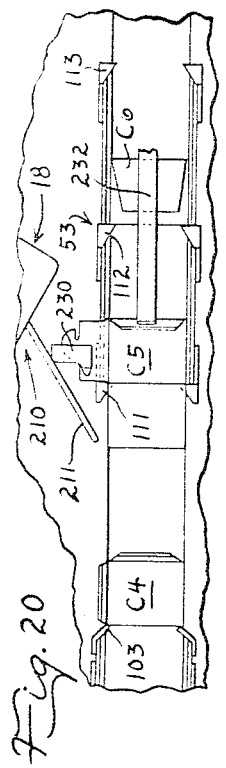
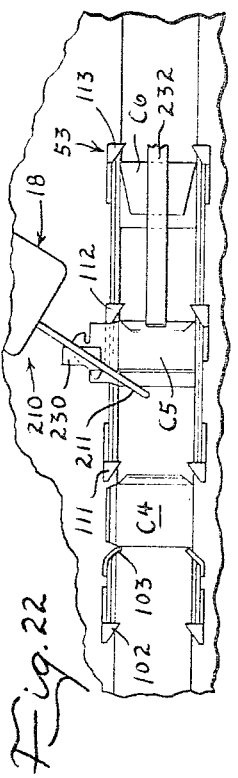
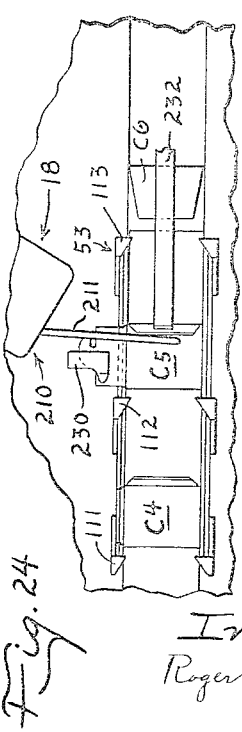
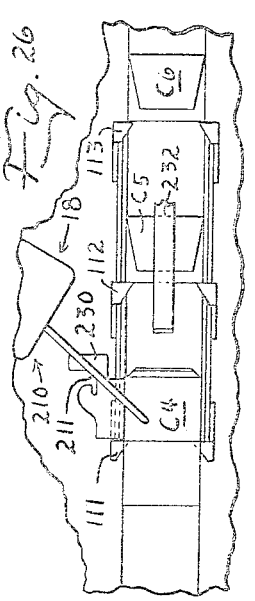

United States Patent Office 3,364,651
Patented Jan. 23, 1968

3,364,651
PACKAGING APPARATUS
Roger H. Stohlquist, Rockford, Ill., assignor to Anderson Bros. Mfg. Co., Rockford, Ill., a corporation of Illinois
Filed Aug. 23, 1965, Ser. No. 481,717
26 Claims. (Cl. 53—266)

ABSTRACT OF THE DISCLOSURE

A packaging apparatus having several stations in which a first reciprocable transfer mechanism advances articles through a first zone past at least one station and a second reciprocable transfer mechanism advances the articles through a second zone past a second station, with a drive means for reciprocating the first transfer mechanism through a first cycle and for reciprocating the second transfer mechanism through a second cycle which is out of phase with the first cycle. The first transfer mechanism preferably includes two sections which are spaced apart along the packaging machine with the second transfer mechanism located between the sections of the first transfer mechanism to move the articles in a zone intermediate the sections of the first transfer mechanism, but at a velocity which is instantaneously different than the velocity of the movement of the first transfer mechanism. The packaging apparatus also includes a nozzle for dispensing a stream of plastic material at a filling station, an elevator at the filling station, and a mechanism for raising the elevator and controlling downward movement of the same. The packaging apparatus is arranged for packaging cartons of the type having closure flaps on the ends of the walls and has a swingably mounted flap folding mechanism for folding the trailing flap on the carton.

---

This invention relates to packaging apparatus.

In a packaging apparatus having plural stations such as a container setup station; a filling station; and a container closing station, the maximum rate at which the packaging machine can operate to package materials in containers is controlled to a large extent by the time required to complete the filling cycle. The overall filling cycle time is, in turn, determined by the time required to dispense the desired amount of the material into a container, commonly referred to as the fill time, together with the additional time required to move the filled container away from and a succeeding empty container to the filling station, herein referred to as the filling station transfer time. The overall filling cycle time can thus be decreased by increasing the rate at which material is dispensed into the container, to shorten the fill time. However, since the overall filling cycle time is also affected by the filling station transfer time, that is, the time required to move the containers past the filling station, it is also very desirable to speed up the filling station transfer time. Moreover, in filling machines of the type disclosed, in the patent to S. F. Anderson, No. 2,612,016, wherein the material is dispensed in a continuous fashion from a nozzle into containers as they are moved past the filling station, it is not merely desirable, but essential, that the filling station transfer time be decreased as the rate of flow material through the nozzle is increased, to avoid an excessive discharge of material from the nozzle during movement of the containers past the filling station.

While it is often a relatively simple matter to increase the rate of flow of material to the containers to shorten the filling time, problems are encountered in speeding up operation of the transfer mechanism to shorten the transfer time. Prior packaging apparatus in general employ a common transfer mechanism for advancing the containers past the several stations, including the filling station. The common transfer mechanism has a relatively large mass and when the velocity at which the transfer mechanish operates is increased to shorten the transfer time at the filling station, the mechanical problems in driving the relatively massive common transfer mechanism, are greately amplified. Further, operation of the common transfer mechanism at the speed and in the manner best suited to minimize the time required to move the containers past the filling station, is frequently not best suited for moving the containers past the other stations of the packaging machine.

An important object of this invention is to provide a packaging machine which is adapted for filling a container at high speeds.

Another object of this invention is to provide a packaging machine having an improved transfer mechanism for advancing the containers at relatively different velocities past the several stations of the packaging machine.

Another object of this invention is to provide a packaging machine of the type having a transfer mechanism which is intermittently operated to advance the containers past the several stations and which is so arranged as to produce an initial relatively rapid movement of the containers past the filling station and an initial relatively slower movement of the containers past at least one other station.

A further object of this invention is to provide a packaging machine operable as the containers are filled to advance the containers past the several stations of the packaging machine, and wherein the transfer mechanism has one transfer section for moving the containers past the filling station and a second transfer section for moving the containers past a different station and wherein the several sections are moved at a velocity and a manner best suited for advancing the containers past their reespective stations.

Still another object of this invention is to provide an apparatus for filling containers of the type wherein a semi-fluid plastic material is continuously dispensed through a downwardly opening nozzle and the containers are elevated at the filling station into telescoping relation to the nozzle and moved downwardly as they are filled, and which packaging apparatus, has an improved arrangement for controlling downward movement of the elevator during filling, to support the container in a manner to assure proper filling of the container, and which apparatus automatically allows the elevator to drop to a lower level for receiving a succeeding empty container as it is advanced to the filling station.

Yet another object of this invention is to provide a packaging apparatus having a simple and reliable arrangement for folding the top trailing flap on a container.

These, together with other objects of this invention will be more readily appreciated as the invention becomes better understood by reference to the following detailed description, when taken in connection with the accompanied drawings wherein:

FIGURE 1 is a front perspective view of the packaging machine embodying the present invention;

FIGURE 2 is an elevational view of one side of the packaging machine with the cover plate for the drive housing removed to illustrate details of the construction;

FIGURE 3 is an elevational view of the other side of the packaging machine with certain cover plates removed and with parts broken away and shown in section to illustrate details of the construction;

FIGURE 4 is a horizontal sectional view taken on the plane 4—4 of FIG. 3;

FIGURES 5, 6, 7, 8 and 9 are diagrammatic views illustrating the transfer apparatus and the drive mechanism therefor in different moved positions;

FIGURES 10a and 10b constitute two parts of the plan view of the reciprocable transfer members on an enlarged scale;

FIGURES 11a and 11b constitute two parts of a side elevational view of one of the transfer members;

FIGURES 12a and 12b constitute two parts of a side elevational view of the other of the transfer members;

FIGURE 13 is a transverse sectional view of one side of the transfer mechanism, taken on the plane 13—13 of FIG. 4;

FIGURE 14 is a transverse sectional view through the rear transfer member, taken on the plane 14—14 of FIG. 4;

FIGURE 15 is an end elevational view taken on the plane 15—15 of FIG. 2;

FIGURE 16 is a vertical sectional view through the packaging machine taken on the plane 16—16 of FIG. 3;

FIGURE 17 is a vertical sectional view taken on the plane 17—17 of FIG. 3;

FIGURE 18 is a fragmentary sectional view taken on the plane 18—18 of FIG. 4 and illustrating the operating mechanism for the upper trailing flap folder;

FIGURE 19 is a view taken on the plane 19—19 of FIG. 18 and illustrating the operating mechanism for the flap folder;

FIGURES 20 through 27 are diagrammatic views illustrating different moved positions during a cycle of operation of the upper trailing flap folding apparatus;

FIGURE 28 is a schematic wiring diagram of the packaging apparatus;

FIGURE 29 is a graph illustrating the relative displacement of the several sections of the transfer mechanism during a cycle of operation;

FIGURE 30 is a view illustrating a carton in its initial flattened condition;

FIGURE 30a is a perspective view of a carton with the top flaps open;

FIGURE 31 is a side elevational view of the carton magazine for the packaging machine;

FIGURE 32 is an end elevational view of the carton magazine; and

FIGURE 33 is a view of the elevator operating cam on an enlarged scale.

The present invention relates generally to improvements in packaging machines and is particularly for use in packaging machines of the type shown in the patent to S. F. Anderson, No. 2,612,016 wherein material is dispensed at a filling station and containers are intermittently advanced in step fashion past several stations including the filling station. The overall packaging machine is illustrated in FIG. 1 and, in general, includes a frame structure 10; a transfer mechanism 11 for intermittently advancing cartons in step fashion; a hopper 12 for storing a stack of flattened cartons; carton opening and erecting mechanism 13 (FIG. 3) engageable with the cartons to move the same off the stack and for opening and squaring the cartons; a lower flap folding mechanism 15 for enfolding and closing the lower flaps on the cartons as they are advanced by the transfer mechanism; a filler nozzle 16; an elevator mechanism 17 for elevating the containers at the filling station and around the nozzle; and an upper flap folding mechanism 18 for folding and closing the upper flaps on the cartons. The transfer mechanism is intermittently operated as the containers are filled and is advantageously arranged to actuate the carton erecting mechanism 13 to remove a flattened carton from the stack in the hopper 12 and to open and square the carton. The cartons, after being opened and squared, are advanced past the lower flap folding mechanism 15 to fold and close the bottom flaps and the partially closed containers are then advanced to the filling station below the nozzle 16. The filling machine is preferably of the type wherein semi-fluid or plastic material is continuously dispensed through the nozzle and, in order to avoid interference with the material emerging from the nozzle, the cartons are advanced to the filling station at a level with the tops of the cartons spaced somewhat below the nozzle as shown at C3 in FIG. 2. The cartons are then raised at the filling station by the elevator 17 and the cartons move downwardly as they are filled, as shown at C4 in FIG. 2. When the carton is adjacent to lower end of the nozzle, the cartons are moved crosswise to the nozzle to sever the material in the container from the material emerging from the nozzle, and the cartons are thereafter advanced past the top flap folding mechanism 18 to close the top of the carton.

As the rate of flow of material to the nozzle is increased, to increase the speed at which the containers are filled, it becomes correspondingly necessary to increase the speed at which the filled container is moved away from the nozzle and a succeeding empty container is moved into position below the nozzle, in order to avoid excessive discharge of material from the nozzle during transfer of the containers past the filling station. However, substantial mechanical problems are encountered when a relatively large and massive transfer mechanism is operated at high velocities, and these problems are particularly aggravated in an intermittently operated reciprocating type transfer apparatus. The stresses and loads on the transfer apparatus and drive mechanism increase exponentially with the velocity at which the transfer mechanism is accelerated and decelerated at the beginning and end of each cycle. Further, while it is necessary to effect an initial very rapid movement of the containers as they move past the filling station, such initial rapid movement is not necessary, or even desired, for moving the containers past other stations of the packaging machine.

Referring now more specifically to the accompanying drawings, the base 10 of the packaging machine includes a generally horizontal frame structure 25, conveniently supported on wheels 26, or the like, and having housings 27 and 28 adjacent to opposite ends. The housings are conveniently arranged to form enclosures for different parts of the drive apparatus and also form supports for the transfer mechanism.

TRANSFER APPARATUS

The containers are laterally guided by a spaced lateral guide rail at opposite sides and, in the form shown, the guide rails comprise first and second channel shaped members designated 31 and 32, mounted in opposed relation to each other and defining lateral guide edges 31′ and 32′ on the ends of the upper and lower legs of the respective channel members. The channel members are supported on the housings 27 and 28 and extend therebetween. As best shown in FIG. 15, the housing 27 has an upwardly extending housing portion 27′ and the channel member 31 is secured adjacent one end, as by fasteners 33, to the upwardly extending portion 27′ of the housing 27. The other channel member 32 is supported at one end on an upwardly extending post 34 attached to the housing 27 and the member 32 is advantageously mounted in a T-bracket 34′ for limited lateral adjustment relative to the other channel member 31, to accommodate cartons of slightly different size. The other housing 28 includes intermediate wall panels 35 and 36 and, as best shown in FIG. 17, the channel member 31 is rigidly secured to the innerface of one of the upright walls 35. The other channel member 32 is guidably supported, as indicated at 38 in FIG. 4, on the other intermediate wall 36 of the housing 28 and is made laterally adjustable relative to the channel member 31 as by a screw adjuster 39.

The channel member 31 has rails on the opposed top and bottom legs thereof defining upper and lower grooves, designated 31″, disposed in a vertical plane and defining guideways for slide members of the transfer mechanism.

Similarly, the channel member 32 has rails on the legs thereof defining upper and lower opposed grooves 32" which also form guideways for slide members of the transfer apparatus. As best shown in FIGS. 13–17, the grooves 31" and 32" are offset somewhat from the carton guides 31' and 32' respectively.

The filler nozzle 16 is mounted in overlying relation to the space between the carton guide members 31 and 32 and, as shown, comprises a generally rectangular nozzle body 41 having a cross section somewhat smaller than the container to be filled and which is preferably tapered inwardly at its lower end to facilitate guiding of the container in telescoping relation with the nozzle. The nozzle is connected, as through pipes 42, to a source or sources of semi-fluid plastic material (not shown), such as continuous type freezers which deliver ice cream, sherbet, or the like, and the nozzle is conveniently detachably mounted as on a plate 43 carried by a support post 44 (FIG. 16) that extends upwardly from one of the channel members 31. In accordance with the present invention, the reciprocable transfer apparatus includes a first transfer mechanism 51, hereinafter sometimes referred to as an auxiliary transfer mechanism, for moving a filled container away from the filling station and for advancing a succeeding empty container to the filling station, and a second transfer mechanism 52, hereinafter sometimes referred to as the inlet section of the main transfer mechanism, for advancing empty containers from the loading station or magazine 12 past the lower flap folding station to a position in advance of the filling station. The main transfer mechanism also advantageously includes a second section designated 53 for continuing the advance of the filled containers after they have been moved away from the filling station by the auxiliary transfer mechanism.

As best shown in FIGS. 10a, 11a and 12a, the first section 52 of the main transfer mechanism includes slide members 55 and 55' which are respectively supported in the guideways 31" and 32" for reciprocation lengthwise of the channel shaped guide members. The slide members 55 and 55' have carton pushers mounted thereon and so arranged as to engage a carton and advance the same when the slide members are extended, and to bypass the carton during retraction of the slide members. As best shown in FIGS. 10a, 11a, and 12a, the slide members 55 and 55' have first laterally shaped carton pushers, designated 56. The carton pushers 56 can be formed in any manner suitable to engage and advance a carton when the slide members are extended and to bypass the carton or container when the slide members are retracted and, as shown herein, the pushers 56 have a like construction and like numerals are used in corresponding parts. The pushers 56 each include a plate portion 56a which overlies the outer face of the respective slide member, and which plate portion is attached to the slide member for movement therewith and for limited movement laterally of the slide member, as by pins 56b. A spring 56e is attached to the pins and engages the plate portion 56a to resiliently urge the pushers into carton engaging position. In th embodiment shown, each pusher 56 includes several separate plates 56a and each plate has one and, preferably, several carton engaging fingers extending laterally thereof. The carton engaging fingers extend through notches or openings 55a in the respective slide member and have a carton engaging face 56c at the end that leads during extension of the pusher members, and a cam face 56d on the end of the finger that trails during the extension of the pusher members. The carton engaging face 56c extends generally perpendicular to the slide member to engage the rear side of a carton to advance the same during extension of the sides, and the cam face 56d is inclined to the path of travel of the slide members to engage the carton during retraction and to cam the fingers laterally out of the path of the cartons.

The slide members 55 and 55' also have second laterally aligned carton pushers 58 spaced in a direction paralleling the path of travel of the slide members from the carton pushers 56. The carton pushers 58 are generally similar to the pushers 56 and each include a plate portion 58a which is mounted as by pins 58b on the respective slide member for movement therewith and for limited shifting laterally of the respective slide member. The pushers 58 also preferably include several plates 58a arranged one above the other and preferably have several laterally extending carton engaging fingers, each defining a carton pusher face 58c and a cam face 58d. For reasons pointed out hereinafter, the laterally extending carton engaging fingers are preferably vertically spaced apart, as best shown in FIGS. 11a and 12a, and have notches or recesses indicated as 58f therebetween. The slide plates 58 and 58' are also preferably notched, as indicated at 55b, in areas that register with the notches 58f in the pusher members 58.

As previously described, the first or inlet section 52 of the main transfer mechanism is arranged to advance a container to a position in advance of the filling station. Containers may be fed to the inlet section of the main transfer mechanism in any desired manner, and may for example, be fed in the manner disclosed in the aforementioned patent to Anderson, No. 2,612,016. The particular erecting mechanism illustrated herein is of the type disclosed and claimed in the application of Ralph F. Anderson and Leo Strombeck, Ser. No. 341,527, filed Jan. 31, 1964 for Carton Infeed Mechanism and now Patent No. 3,298,288, issued Jan. 17, 1967. In general, the carton infeed mechanism includes a magazine 61 defining bottom guides 62 and lateral carton guides 63 for storing a stack of flattened cartons of the general type shown in FIG. 30. A mechanism 64 is provided for advancing flattened cartons toward the transfer mechanism and into engagement with stop pins 68 so that the end carton in the stack is laterally offset to one side of one of the transfer members such as the transfer member 55'. When the cartons are in their flattened condition, as shown in FIG. 30, one side wall $a$ and one end wall $b$ overlie the other side wall $c$ and end wall $d$, and top and bottom flaps $a'$, $b'$, $c'$ and $d'$ are disposed in the plane of the respective walls $a$–$d$. A plurality of vacuum operated grippers 65 herein sometimes referred to as vacuum cups, are provided for engaging the face of an end carton in the stack and are swingable on arms 66 about a pivot axis 67, from a position engaging one of the panels of the end carton in the stack, to a position alongside of the transfer member 55', to move that panel of the carton laterally off the stack and into position alongside the transfer member. The vacuum cups 65 are preferably arranged to engage either the carton end panel $b$ or the end flaps $b$ and $b'$ on that panel or both, to move the end panel $b$ into parallelism with the transfer member 55'. A means is proveded for opening the carton in response to movement of the panel $b$ laterally off the stack into engagement with the conveyor and, as shown, the stop fingers 68 are arranged on the magazine to engage carton end flaps such as $c'$ on the other side of the carton to restrain the movement of the side wall $c$ during movement of the end wall $b$ of the end carton away from the stack to thereby open and substantially square the carton. The vacuum operated grippers 65 are moved in timed relation with the transfer mechanism and, as shown, a spring means 69 is provided to yieldably urge the grippers toward the stack, and a cam means 71 is provided on the transfer member 55' and engages a follower 72 on the arm. The cam means is shaped to allow the grippers 65 to swing toward the stack and engage a carton, when the transfer members are retracted, and to positively swing the vacuum operator grippers back to the position shown in FIG. 4, adjacent the transfer member 55', when the transfer members are extended.

A vacuum pump 80 is provided on the machine and the application of vacuum to the vacuum operated grippers 65 is controlled by a vacuum control apparatus 81, herein shown (FIG. 4) in the form of a vacuum control valve having a follower 82 operated by a cam 79 on the transfer member 55'. The vacuum control apparatus releases the vacuum on the grippers 65, when the grippers reach a position as shown in FIG. 4, and applies vacuum to the grippers when the transfer means is retracted and the cups move into engagement with the end carton on the stack.

An apparatus for enfolding the lower trailing flap $c'$ is advantageously provided on the transfer member 55'. As best shown in FIGS. 10a and 12a, this apparatus comprises a generally L-shaped member 83 which is swingably mounted on a pin 84 attached to the slide member 55'. A cam follower 85 is operatively connected to the pin 84 and engages a cam track 86 on the inner face of the channel member 31. The cam track is shaped, as shown in FIGS. 5–9, to allow the L-shaped lower flap folding member to extend downwardly until the slide member 55' approaches its extended position. At that time, the trailing flap folder is cammed upwardly, as shown in FIG. 9, to enfold the lower trailing flap $c'$. The L-shaped member operates to advance the container with the transfer member 55' and to support the same and is spaced from the carton pushers 56 a distance less than the stroke of the transfer members.

The remaining flaps on the lower end of the carton are folded inwardly by the lower flap folding apparatus 15 when the cartons are advanced by the inlet section of the main transfer mechanism. The configuration of the lower flap folding apparatus will vary, dependent on the configuration and arrangement of the end flaps on the lower end of the carton and, since such flap folding apparatus is well known, and may, for example, be of the type shown in the aforementioned Anderson Patent 2,612,016, detailed illustration and description of the same is deemed unnecessary. This lower flap folding apparatus is shown in elevation in FIGS. 1, 2, and 3 but is not illustrated in the other views of the drawings, to simplify illustration.

Mechanism is also advantageously provided for folding the lead flap $a'$ on the upper end of the carton forwardly to assure that the top of the carton is opened for the subsequent filling of the same. As shown, this flap folder includes an arm 88 pivotally mounted on a shaft 89 for swinging movement in an arc to engage the lead flap $a'$ on the upper end of the side wall $a$ of the carton. The flap folding arm 88 is operated in timed relation with the movement of the transfer mechanism and, as shown in FIGS. 3 and 5–9, is connected through an arm 91 and link 92 to an arm 93 mounted for rotation with a shaft 94. A cam follower 95 is attached to the shaft 94 and engages a cam 96 on the slide member 55' to oscillate the arm as the slide member is extended and retracted. In general, the cam 96 operates to elevate the arm 88 when the slide is retracted and allows the arm to move downwardly by action of springs 90a and 90b to fold the lead flap on the upper end of the carton forward, as the slide member is extended.

The auxiliary transfer mechanism 51 is arranged to move the filled carton away from the filling station and to advance a subsequent empty carton to the filling station. As best shown in FIGS. 10a, 11a and 12a, the auxiliary transfer mechanism 51 includes slide members 101 and 101' which are respectively mounted in the guideways 32" and 31" of the channel shaped guide members 32 and 31. A third pair of carton pushers 102 are provided on the auxiliary slide members 101 and 101' respectively adjacent the inlet end thereof and a fourth pair of carton pushers 103 are also provided on the plates 101 and 101'. As shown, the pusher members 102 have the same general construction and mounting as the pusher 58, and detailed description is deemed unnecessary. It is to be noted, however, that the pushers 102 are formed complementary to the pushers 58 and that the lateral carton engaging fingers 102c on the pushers 102 are vertically offset from the corresponding fingers 58c on the pushers 58 so that the fingers 102c and 58c can interleave or interdigitate. The ends of the slide members 101 and 101' are recessed as indicated at 101a (FIG. 11a) and the pusher members are also notched as shown at 102e (FIG. 12a), to accommodate the aforedescribed interleaving of the fingers.

The carton pushers 103 are arranged to move the filled carton crosswise of the nozzle and away from the filling station. As best shown in FIGS. 10a and 11a, the pusher 103 preferably has a relatively wide blade portion extending at an angle through a notch 101b in the slide member 101, and which blade portion defines a vertically elongated carton engaging edge 103c. The pusher is supported on the slide member for movement therewith and is yieldable laterally relative to the slide member to bypass the container during retraction of the slide. As shown in FIG. 11a, the pushers 103 are disposed adjacent the upper portion of the slide members 101 and 101'. A preferably fixed pusher 104 is provided adjacent the lower portion of the slide members 101 and 101' and has the forwardmost portion 104a thereof disposed in substantial vertical alignment with the carton engaging edge 103c of the pushers 103 to aid in pushing the carton crosswise of the nozzle. The rear edge 104b of the pusher 104 is arranged to provide a stop engageable with the front wall of the succeeding empty carton, to position the same with respect to the pushers 102 and to prevent tipping of the carton.

The second section 53 of the main transfer mechanism includes slide members 110 and 110', also mounted in the guideways 32" and 31" on the channel shaped guide members 32 and 31. As best shown in FIGS. 10b, 11b, and 12b, the second or outlet section of the main transfer apparatus includes three opposed pairs of pusher members 111, 112, and 113 arranged at longitudinally spaced points along the slide members 110 and 110' respectively. The pushers 111, 112 and 113 are arranged to continue the advance of the filled cartons after they have been moved away from the filling station by the auxiliary transfer mechanism, and to move the filled cartons past the top flap folding mechanism and out of the filling machine. As is apparent, the number of pushers can be varied as required. The pushers are each similarly constructed in the manner previously described in connection with the pushers 56 and each include a carton engaging edge designated 111c, 112c and 113c respectively. As previously described, the pushers have cam faces on their trailing edges arranged to cam the fingers laterally out of the path of movement of the cartons, during retraction of the slide members 110, 110'.

TRANSFER DRIVE MECHANISM

A drive mechanism is provided for reciprocating the transfer members and which is operable to drive the same through a cycle when the carton at the filling station is filled. In order to enable the packaging machine to operate at high speeds and prevent excessive discharge of material from the nozzle during the transfer of cartons past the filling station, the drive mechanism is arranged to produce an initial very rapid movement of the auxiliary transfer members to rapidly move the filled carton crosswise of the nozzle and to move the succeeding empty carton into position below the nozzle. However, because of its greater mass, such rapid starting and stopping the main transfer mechanism would produce excessive stresses on the drive mechanism, and the latter is accordingly advantageously arranged to produce an initial relatively slower movement of the main transfer mechanism to provide progressive acceleration and deceleration of the same at the ends of its reciprocation.

The transfer mechanism drive includes a drive motor 121 (FIG. 2) which is operatively connected to a variable speed drive such as a "Reeves" pulley drive 122. The variable diameter pulley 122 is connected through a belt 123 to a pulley 124 on a one revolution clutch 125 (see FIGS. 3 and 17). The clutch has an actuator 126 such as an electro-responsive solenoid which, when momentarily energized, operates the clutch to drive the output drive shaft 127 through one revolution. The transfer mechanism is shown in a normal or stop position in FIGS. 2–4 and, as shown, the auxiliary transfer members are stopped in a position with the carton engaging edge 103c of the pushers 103 disposed alongside the carton being filled at the nozzle. The other carton engaging pushers 102 on the auxiliary transfer mechanism are spaced from the pushers 103 a distance somewhat greater than the width of a carton so that succeeding empty carton will be moved into position below the nozzle as the filled carton is moved out of position. The one revolution clutch 125 is actuated under the control of a switch mechanism 131 having a switch actuator 132 (FIG. 4) arranged to be engaged by a carton when it moves downwardly during filling to a level at which the top of the carton is disposed adjacent the lower edge of the nozzle 41. The drive mechanism is arranged to produce an additional very rapid movement of the auxiliary transfer mechanism so that the pusher 103 rapidly moves the filled carton crosswise of the nozzle and the pushers 102 of the auxiliary transfer mechanism move a succeeding empty container into position below the nozzle. The drive for the transfer mechanism advantageously comprises a crank having a pin 134 disposed eccentric to the shaft 127, and a linkage arrangement for operatively connecting the crank pin 134 to the auxiliary transfer mechanism to reciprocate the latter. As best shown in FIGS. 2 and 3, this linkage includes levers 136, 136' secured intermediate their ends to relatively opposite ends of a shaft 137 rotatively journaled in the intermediate plates 35 and 36 of the housing 28. A link 139 is connected at one end to the crank pin 134 and at the other end to a pin 141 on one end of one of the levers 136'. A second pair of links 142, 142' are pivotally connected by pins 143, 143' to the other end of the respective levers 136, 136'. The other end of the links 142, 142' are connected to pins 144, 144' guidably supported in guideway 145, 145' on the channel members 31, 32. The pins 144, 144' are in turn connected through rods 146, 146' to the respective auxiliary slide members 101, 101'. The one revolution clutch 125 is operable, when actuated, to rotate the shaft 127 from the initial position, shown in FIG. 3 in the direction indicated by the arrow in that figure, through one revolution. As will be seen, the link 139 extends approximately perpendicular to the plane of eccentricity of the eccentric 134, that is the radial plane through the crank pin 134 and the shaft 127, so that the travel of the auxiliary transfer mechanism will vary approximately as the sine of the angular displacement of the eccentric 134 from its initial position. The curves designated 102 and 103 in FIG. 29 are approximate plots of the position of the pushers 102 and 103 on the auxiliary transfer mechanism as the crank rotates through one revolution from its initial position shown in FIG. 3. As will be seen, the auxiliary transfer members initially move forwardly and, during this initial movement, the rate of travel of the auxiliary transfer mechanism is a maximum. The direction of movement of the auxiliary transfer mechanism reverses when the pushers 102 on the auxiliary transfer members advance the succeeding empty carton to a position below the nozzle as shown in FIG. 5 and the pushers thereafter retract past the initial position, as shown in FIGS. 6 and 7, to a fully retracted position and finally move forward as shown in FIG. 9 and stop in the position shown in FIG. 3 at a point approximately intermediate with the ends of their stroke.

A second linkage arrangement is provided for operating at least one section of the main transfer mechanism out of phase with the auxiliary transfer mechanism and, conveniently, both the first and second sections of the main transfer mechanism are operated in unison with each other, but out of phase with the auxiliary transfer mechanism. As best shown in FIGS. 10a, 10b, 11a, 11b, and 12a, 12b, the main slide members 55 and 110 are interconnected by bars 151 and 152 and, similarly, the main slide members 55' and 110' are interconnected by bars 151' and 152' so that the two sections of each of the main transfer members will move in unison. As shown, the bars are secured to their respective slide members as by fasteners 153 and spacer blocks 154 so that the bars are laterally spaced from the outer sides of the respective slide members.

The drive mechanism for the main transfer apparatus includes levers 156 and 156' which are secured intermediate their ends to a shaft 157 rotatably journaled in the plates 35 and 36 of the housing 28. The crank 134 is connected through a link 158 to pivot pin 159 on one end of one of the levers 156'. A second pair of links 161 and 161' have one end connected by pins 162, 162' to the other ends of the levers 156 and 156'. The other ends of the links 161, 161' are connected by pins 164, 164' to rods 167, 167' which are slidably mounted in guides 165 and 165' on the plate 36 and channel member 31, respectively. The rods 167, 167' are detachably connected to fittings on the respective connector bars 151, 151'. As will be seen from FIG. 3, the shaft 157 is located with relation to the drive shaft 127 and crank 134 such that, when the crank is in its initial position shown in FIG. 3, the link 158 is disposed substantially in the plane of eccentricity through the shaft 127 and eccentric 134. Consequently, the travel of the main transfer mechanism will vary approximately as a cosine function of the angular displacement of the eccentric 134 from its initial position, shown in FIG. 3. Advantageously, the main transfer mechanism is operated at an angular displacement of about ¾ of a revolution, that is, about 270° phase lag with respect to the auxiliary transfer mechanism. With this phase relationship between the auxiliary and main transfer mechanisms, the auxiliary and main transfer mechanisms begin moving at relatively different speeds when the clutch is actuated and, moreover, move in relatively opposite directions, as is clearly shown in FIG. 29. Since the travel of the main transfer mechanism varies as a cosine function, its rate of movement is a minimum at the start and end of each cycle so as to minimize the stresses imposed upon the drive mechanism including the one revolution clutch and the crank and linkage arrangement for connecting the clutch to the transfer mechanisms. Moreover, it will be seen that the initial movement of the auxiliary and main transfer mechanisms is in relatively opposite directions so as to reduce longitudinal vibration of the machine during reversal of the direction of movement of the main and auxiliary transfer mechanisms. The stroke of the main and auxiliary transfer mechanisms is so arranged that the path of travel of the carton engaging fingers 102 and 103 on the auxiliary transfer apparatus respectively overlap in part the path of travel of the carton engaging fingers 58 and 111 on the main transfer apparatus. Moreover, the carton engaging fingers 102 on the auxiliary transfer apparatus and the carton engaging fingers 58 on the inlet section of the main transfer apparatus are arranged to interleave to transfer empty cartons from the inlet section of the main transfer mechanism to the auxiliary transfer mechanism. As shown in FIG. 29, the phase relationship between the movement of the main and auxiliary transfer mechanisms is such that the main transfer fingers 58 and auxiliary transfer fingers 102 overlap and interleave during the latter portion of the cycle and while the main and auxiliary transfer mechanisms are both moving in a forward direction. The cartons are thus transferred from the inlet section of the main transfer mechanisms to the auxiliary transfer mechanism without any interruption of the forward advance of the cartons. The path of travel of the pushers 103 which move the filled container away from the filling station overlaps the path of travel of the fingers 111 on the outlet section of the main transfer mechanism, but the phase relationship is such that this overlap in the travel occurs at relatively different times during the cycle so that the advance of the filled container by the pushers 103 stops a short interval before the filled containers are picked up by the fingers 111.

The containers as they are advanced to the filling station are supported by the aforedescribed flap folding mechanism 15 at a level such that the upper edges of the sidewalls of the cartons are spaced below the nozzle a selected distance so that the top of the carton does not interfere with the material emerging from the nozzle as the empty carton is moved into position at the filling station. The elevator mechanism 17 is operated in timed relation with the operation of the transfer mechanism to elevate the empty carton when it is advanced to a position below the nozzle. The elevated carton then moves downwardly as it is filled and, advantageously, the elevator apparatus in the present invention is arranged to counterbalance the carton and yieldably oppose downward movement of the same during filling. As shown, the elevator comprises a platform 175 (FIGS. 3, 4 and 16) which is mounted by legs 176 on a pintle 177. The pintle is supported on the outer end of levers 178 and 178' which are secured to a shaft 179 rotatably supported in the plates 35 and 36 of the housing 28. The levers are attached to the exposed portion of shaft 179 in the space between plates 35 and 36 to allow swinging movement of the members 178, 178' in a vertical plane and, as best shown in FIG. 3, a parallelogram type linkage including an arm 181 attached to the pintle and a link 182 pivotally attached to the arm at 183 and to the housing at 184, is provided to maintain the platform 175 horizontal as the elevator is raised and lowered. As will be seen from FIG. 3, the pivot point 184 of the link 182 is spaced above the shaft 179 a distance equal to the length of the arm 181 to form the aforedescribed parallelogram type linkage with the levers 178, 178'. The elevator is yieldably urged to its raised position by a spring 184 attached to an arm 185 carried by the shaft 179 (see FIG. 2). The other end of the spring is connected through a cable 186 entrained over a pulley 187 to an adjusting screw 188 to allow adjustment of the counterbalance force applied to the elevator. This counterbalance force applied to the elevator is adjusted so as to yieldably oppose downward movement of the elevator and cartons during filling of the latter and is preferably selected so as to just counterbalance the weight of the filled carton and elevator.

A cam apparatus, conveniently connected to the shaft 127, is provided for effecting positive upward and downward movement of the elevator during certain portions of the cycle. As shown in FIGS. 3, 5 through 9, a cam follower 191 is mounted on a member 192, herein shown in the form of a generally L-shaped lever pivotally supported on the frame at 193. The lever 192 is connected intermediate its ends through a link 194 to an arm 195 attached to the shaft 179. A cam member 196 having inner and outer cam surfaces 197 and 198 is provided for engaging the follower 191 to control movement of the elevator. In general, the inner cam surface 197 is shaped to control the lowermost position that the elevator can assume in the different rotated positions of the cam and the other cam surface 198 is shaped to control the uppermost position that the elevator can assume in the different rotated positions of the cam and the other cam surface 198 is shaped to control the uppermost position that the elevator can assume in the different rotated positions. As best shown in FIG. 33, the inner cam surface has a dwell portion 197a which is adapted to engage the follower 191, when the cam member is in its initial or stop position, as shown in FIG. 3, to limit downward movement of the elevator to a position, as shown in FIG. 3, in which it is at a level spaced below the nozzle a distance substantially equal to the height of the carton. In this manner, the elevator will support the filled carton when the upper edge of the carton is adjacent the lower edge of the nozzle, to guide the filled carton during movement crosswise of the nozzle and onto the outlet carton support rails 201. However, when the cam is in its initial position shown in FIGS. 3 and 33, the adjacent portion 198a of the outer cam surface 198 is spaced outwardly from the inner cam surface a distance greater than the cross section of the cam follower 191 so that the cam follower can float radially therebetween. In this manner downward movement of the elevator and carton is controlled by the counterbalance spring 184 until the elevator reaches the level shown in FIG. 3, at which time the follower engages the inner cam surface 197a.

In order to allow the succeeding empty carton to advance to the filling station with the top of the carton spaced below the nozzle to avoid interference with the material emerging from the nozzle, the cam is arranged to positively force the elevator downwardly during the initial rotation of the cam. Thus, the inner and outer cam surfaces are formed with portions 197b, 198b shaped to engage the follower 191 during the initial angular movement of the cam from the initial or stop position and force the same in a direction to positively lower the elevator a distance sufficient to allow the succeeding empty container to advance to the filling station with the top of the empty containers spaced below the nozzle. The inner and outer cam surfaces are formed with complementary portions 197c, 198c shaped to hold the elevator in its lowered position until the shaft 127 has turned about 90° from its initial position to allow the auxiliary transfer mechanism to move a carton into position below the nozzle. The inner cam surface is formed with a cam lobe 197d shaped to rapidly raise the elevator after the empty carton has moved into position on an elevator, and the outer cam surface is relieved at 198d to allow this motion. After the elevator and carton are positively raised into telescoping relation, it is desirable to allow the elevator and carton to move downwardly under the control of the counterbalance spring 184. Accordingly, the inner cam 197 is shaped at 197e to rapidly return to its inner dwell portion 197a to avoid interference with downward movement of the elevator during filling of the carton. The outer cam surface in the portion 198e opposite the dwell 197a is radially spaced at its maximum relieved diameter corresponding to the fully raised portion of the elevator and gradually curves inwardly to the intermediate diameter at 198a in a manner such as to avoid forcing the elevator downwardly during filling of the carton. Stated otherwise, the elevator begins to move downwardly under the control of the material emerging from the nozzle and the counterbalance spring 184 after being raised by the inner lobe 197d. The portion of the outer cam surface 198e and inner cam surface 197e are shaped to remain spaced from the follower 191 as the carton is filled.

The carton pushers 103 on the auxiliary transfer mechanism move the filled container to a position at the outer side of the nozzle and the carton pushers 111 on the outlet section of the main transfer mechanism thereafter pick up filled cartons and move the same past the top flap closing apparatus 18. The upper flap folding apparatus includes an improved trailing flap folder, designated generally by the numeral 210. The trailing flap folder comprises an arm 211 mounted for swinging movement on a shaft 212 in a bearing block 213. The end of the arm 211a which is attached to the shaft 212 is laterally offset a substantial distance to one side of the transfer mechanism and is located along the length of the transfer mechanism in a position to be transversely aligned with one of the filled cartons when the outlet section of the main transfer mechanism is in its rest position. In particular, the end 211a of the arm 211 is spaced forward of the pushers 111 on the outlet section of the main transfer mechanism a distance less than the width of the carton, when the pusher 111 is in the normal rest position shown in FIG. 4. The arm is normally disposed, as shown in FIG. 4, to extend from its pivoted end 211a and in a direction opposite the direction of advance of the cartons by the transfer mechanism and with its free end 211b disposed to one side of the cartons on the transfer mechanism. The arm is swingable from its normal position, as shown in solid lines in FIG. 4, upwardly and forwardly along an arc that extends diagonally across the path of travel of the cartons to engage the under side of the upper trail flap C on a carton and to thereafter move forwardly and downwardly to the dotted line position shown in FIG. 4. In the latter position, the arm extends generally horizontally across the top of the carton flap and depresses the carton flap on top of the product in the carton.

The angle of divergence between the arm 211 and the shaft 212 extended, indicated at L in FIG. 4, is made no greater than 45° and preferably somewhat less and of the order of 30 to 35°. As will be seen, the arm 211 defines a generally semiconical surface as it swings between the solid line and dotted line position and the free end 211b of the arm defines a semicircular arc. In order that the arm may extend generally crosswise of the top of the carton when the arm is in its flap folding position shown in dotted lines in FIG. 4, the axis of the shaft 212 is inclined to a vertical plane paralleling the path of movement of the cartons by an angle M which is approximately the complement of the angle L. Thus, when the angle L is 35°, the angle indicated at M should be about 55°.

For best flap folding operation, it is desirable to have the arm extend generally horizontally across the top of the carton when it is in its flap folding position and the end 211a of the arm is accordingly disposed at a level adjacent the level of the top of the cartons. It is also highly advantageous to incline the axis of the shaft 212 to a horizontal plane so as to effectively incline the axis of the cone defined by the arm as it swings between its limiting positions. This reduces the height of the arc defined by the free end 211b as it moves between its limiting positions, and causes the free end to move more rapidly inwardly into underlying relation with the trailing flap on the carton during flap folding. As shown in FIG. 3, the inclination of the shaft to the horizontal, indicated at N in FIG. 18, is made substantially less than the angle of divergence L of the arm 211 with respect to its shaft and, preferably, the angle N is made of the order of 20°. The arm is oscillated from the solid line to the dotted line position, shown in FIG. 4, in timed relation with the movement of the cartons on the main transfer mechanism and, advantageously, the timing is so arranged as to swing the arm from the solid line to the dotted line position to infold the flap on the carton while the main transfer mechanism is being retracted, and, hence, while the carton adjacent the flap folder is at rest. The flap folding arm is then swung from the dotted line position back to the solid line position of FIG. 4 during the subsequent half cycle of operation of the main transfer mechanism, and while the cartons are being advanced thereby. The flap folder is conveniently operated from the linkage which operates the main transfer mechanism and, as shown, an arm 225 is attached to the shaft 157 and is connected through a link 226 to an arm 227 on the shaft 212. During the initial half cycle of the main transfer mechanism, that is while it is being retracted, the transfer levers 156 and 156' swing in a counterclockwise direction, as viewed in FIG. 3, and the flap folding arm 211 is swung in a generally clockwise direction, as viewed in FIG. 3. FIGS. 20–27 diagrammatically illustrate the sequential steps in the folding of the trailing flap on the carton. As shown, the end flap on the end wall of the carton adjacent the flap folder is conveniently held down by a guide shown 230. As the flap folding arm 211 swings about the axis of the shaft 212, it initially moves inwardly and upwardly as shown in FIGS. 21 and 22 to engage the trailing flap on the carton C5 to raise the same and then moves forwardly and downwardly, as shown in FIGS. 23 and 24, to press the trailing flap onto the top of the carton. During the subsequent advance of the cartons by the transfer mechanism, the arm 211 swings upwardly and rearwardly as shown in FIG. 25 and then downwardly as shown in FIGS. 26 and 27 back to its initial position disposed alongside the carton. During its rearward swing, the arm does not perform any useful flap folding function. However, if any of the flaps, including the lead flap, side flap, or trailing flap on the carton, get in the way of the flap folding arm during movement back to its initial position, they are merely deflected by the arm and are not damaged thereby.

The remaining end and lead flaps on the carton can be folded in any suitable manner and the particular flap folding shoes employable vary with different types of cartons. As shown, the lead flap is folded inwardly by an overhead plow 232 and the side flaps are thereafter guided inwardly into overlapping relation by plows (not shown). Advantageously, the overhead plow 232 is arranged to engage the lead flap on the carton C5 at the trailing flap closing station and deflect the lead flap rearwardly at an angle such that the outer edge of the trailing flap wipes across the face of the lead flap as the trailing flap is pressed downwardly by the arm 211. In this manner, the lead flap functions to retain the trailing flap in its folded condition until the enfolding of the lead flap is completed.

A control circuit for the machine is diagrammatically shown in FIG. 28. As shown therein, power is supplied to the main drive motor 121 through conductors 240, 241, and 242 and relay contacts 243. Power is also supplied to a vacuum pump drive motor 244 through conductors 245, 246, and 247 and relay contacts 248. The primary 249 of a transformer is connected through conductors 251, 252 to the power supply conductors and the secondary of the transformer 258 is connected to a control circuit 259 and 261. A relay 262 is connected to the control circuit conductors 259 and 261 through a normally closed "stop" switch 263 and a normally open "start" switch 264. The relay 262 operates, when actuated, to close a holding circuit including contacts 265 connected by conductors 266 in parallel with the start switch 264. Relay 262 also operates contacts 268 to close the same when the relay is energized. A main drive motor relay 271 is connected to the control circuit conductors 259 and 261 through the relay contacts 268 so that the drive motor start relay is energized in response to energizing of the relay 262. Relay 271 operates, when energized, to close the main drive motor contacts 243 to thereby start the main drive motor. The motor start relay 271 also operates to close contacts 275 and a vacuum pump start relay 276 is connected in series with the contacts 275 to the control circuit conductors 259 and 261. Relay 276 operates to close the vacuum pump relay contacts 248 to start the vacuum pump and also operates contacts 278 connected through conductors 279 in parallel with the relay contacts 275 to establish a holding circuit for the vacuum pump relay 276.

As previously described, the one revolution clutch is electrically operated and has electro-responsive operator 126. The electro-response operator 126 is connected to the power conductors 259 and 261 through a series circuit including conductor 282, normally open fill switch 131, and conductors 283 and 284 and relay contacts 268 so that the operation of the clutch is under the control of the fill switch 131, when the main relay 262 is energized. "Jog" switches 285 and 286 are preferably provided to enable operation of the filling machine through a portion of a cycle, as may be desired during setup of the machine or clearing of the machine of damaged cartons. Jog switch 285 is connected through conductors 288 and 282 to the clutch actuator 126 to enable direct energization of the clutch 125 and jog switch 286 is connected through conductors 289 and 283 to the drive motor relay 271 so as to enable direct energization of the main motor 121 and pump drive motor 244 when the jog switches are closed.

OPERATION

The packaging machine is intermittently operated in response to filling of a container at the filling station and is shown in its normal or rest position in FIGS. 2–4 and 20. In the rest position, the main transfer mechanism is at a forward end of its stroke and the auxiliary transfer mechanism is intermediate the end of its stroke. Moreover, the cams 197 and 198 are positioned, as shown in FIG. 3, so as to positively limit movement of the elevator below a position at the level of the outlet carton support members 201, and the trailing flap folding arm 211 is in its retracted position extending alongside one of the cartons, such as C5 on the transfer mechanism as shown in FIG. 20. The container C4 at the filling station moves downwardly as it is filled and, when the top of the container reaches a level adjacent to the lower end of the nozzle, the container actuates the fill switch 131 to energize the one revolution clutch. As the cam 196 begins to rotate in the direction indicated by the arrow in FIG. 3, the package is at first supported by the carton elevating apparatus to guide the package onto outlet carton support members 201, by means of inner cam surface 197a. The inwardly extending lobe 198b on the radially outer cam surface 198 is shaped to engage the follower 191 of the carton elevating apparatus to rapidly move the elevator downwardly to a level below the outlet carton supports 201, and sufficient to allow the next succeeding empty carton to move into position below the filling station. Simultaneously, the pushers 103 on the auxiliary transfer mechanisms start movement of the filled container C4 crosswise of the nozzle and the fingers 102 move the next succeeding empty container C3 to a position below the nozzle. As will be seen from FIG. 4, the fingers 102 and 103 are spaced apart somewhat greater than the width of a carton to provide a slight delay before the next succeeding empty carton begins to move into overlying relation with the conveyor. This delay allows sufficient time for the cam lobe 198b to move the elevator downwardly to receive the container C3. The auxiliary transfer mechanism moves to its fully extended position at approximately the first 90° of movement of the shaft 127 and the inner cam lobe 197d is shaped so as to thereafter rapidly move the empty container C3 upwardly to telescoping relation with the nozzle. The portions 197c and 198e of the cams 197 and 198, as previously described, are arranged so as to thereafter disengage the cam follower 191 to allow the elevator to move downwardly as the container is filled, and against the bias of the counterbalance spring 184. The main transfer mechanism is retracted during the initial approximately 180° of rotation of the shaft 127 so that its initial movement is opposite the direction of movement of the auxiliary transfer mechanism. Moreover, the phase relationship between the main and auxiliary transfer mechanisms is such that the travel of the auxiliary transfer mechanism in a forward direction varies as the sine of the angular displacement of the crank 134 while the retraction of the main transfer mechanism varies as the cosine, to provide progressive acceleration and deceleration at the beginning and end of the stroke of the main transfer mechanism.

During the retraction of the main transfer mechanism, the containers C1, C2, C5, C6, and C7 remain stationary and the upper trailing flap folding arm 211 is swung forwardly during this initial one half cycle to raise and then infold the trailing flap on the carton C5 adjacent the flap folder. As the shaft rotates past the 180° point, the main transfer mechanism begins to move forward and advance the respective containers to the next step. As will be seen from the graph in FIG. 29, the fingers 102 on the auxiliary transfer mechanism and the fingers 58 on the inlet section of the main transfer mechanism overlap during the final portion of the cycle and while both the main and auxiliary transfer mechanisms are traveling in this same direction so that the transfer of the cartons from the pushers 58 to the pushers 102 occurs in one smooth continuous motion and without interrupting the advance of the cartons. The auxiliary transfer members have a fixed stop 104 which engages a forward side of the empty carton being advanced by the pushers 102 on the auxiliary transfer mechanism so as to inhibit tilting of the carton when the auxiliary transfer mechanism stops. During the latter half cycle of the main transfer mechanism wherein the cartons are advanced, the trailing flap folder arm 211 is swung in a direction opposite the direction of movement of the cartons back to its retracted position, shown in solid lines in FIG. 4.

The variable speed drive for rotating the shaft 127 is adjusted in accordance with the rate at which the containers are being filled so as to drive the shaft through one complete revolution in a time somewhat less than required to fill the container at the filling station. Thus, the packaging machine comes back to its initial position a short time interval before the container at the filling station is filled and starts the next succeeding cycle.

Since the auxiliary transfer mechanism initially moves forwardly at its maximum velocity, it will be seen that a filled container is rapidly moved away from the filling station and the next succeeding empty container similarly advanced to the filling station. However, since the main transfer mechanism is operated out of phase with the auxiliary transfer mechanism, and preferably in the order of about 270° out of phase, the initial movement of the main transfer mechanism is relatively slower and is also a relatively opposite direction. This arrangement allows packaging machine to be operated at high speeds. For example, packaging machines have beeen constructed embodying the present invention and which operates to package ice cream and the like at the rate of about 4,000 half-gallon packages per hour, and without causing excessive stresses on the clutch or drive mechanism and with a minimum of vibration. Moreover, operation of the main transfer mechanism so that its travel varies as the cosine of the angular displacement of the crank shaft provides smooth transfer of the containers between successive pushers on the main transfer mechanism and also between the main and auxiliary transfer mechanisms. In this regard, the aforedescribed overlapping of the travel of the pushers 58 and 102 achieved by the out-of-phase operation of the main and auxiliary transfer apparatus enables transfer of the articles from the inlet section of the main transfer mechanism to the auxiliary transfer mechanism while the cartons are in motion.

I claim:

1. In a packaging apparatus having several stations, a transfer means for advancing articles along a path successively past the stations, said transfer means including a first transfer mechanism mounted for reciprocation in a direction generally paralleling said path for moving articles through a first zone past at least one station, said transfer means including a second transfer mechanism mounted for reciprocation in a direction generally paralleling said path for moving articles through a second zone past a second station, said first and second transfer mechanisms having article engaging means for engaging and advancing an article therewith when the transfer mechanisms are moved in one direction and for by-passing the articles when the transfer mechanisms are moved in the other direction, and first drive means for reciprocating said first transfer mechanism through a first cycle, and second drive means operated in timed relation with said first drive means for reciprocating said second transfer mechanism through second cycle which is out of phase with said first cycle.

2. The combination of claim 1 wherein the first and second transfer mechanisms are operated approximately one-quarter cycle out of phase with each other.

3. In a packaging apparatus having several stations, a transfer means for advancing articles along a path successively past the stations, said transfer means including a first transfer mechanism mounted for reciprocation in a direction generally paralleling said path for moving articles throughout a first zone past at least one station, said transfer means including a second transfer mechanism mounted for reciprocation in a direction generally paralleling said path for moving articles through a second zone past a second station, said first and second transfer mechanisms having article engaging means for engaging and advancing an article therewith when the transfer mechanisms are moved in one direction and for by-passing the articles when the transfer mechanisms are moved in the other direction, transfer drive means, means for intermittently operatively connecting said drive means to said first and second transfer mechanisms for reciprocating said first and second transfer mechanisms in timed relation and out of phase with each other.

4. In a packaging apparatus having several stations, a transfer means for advancing articles along a path successively past the stations, said transfer means including a first transfer mechanism mounted for reciprocation in a direction generally paralleling said path for moving articles throughout a first zone past at least one station, said transfer means including a second transfer mechanism mounted for reciprocation in a direction generally paralleling said path for moving articles through a second zone past a second station, said first and second transfer mechanisms having article engaging means for engaging and advancing an article therewith when the transfer mechanisms are moved in one direction and for by-passing the articles when the transfer mechanisms are moved in the other direction, transfer drive means, means for intermittently rotating the drive means from an initial position through one revolution and back to the initial position, means operatively connecting the drive means to said first and second transfer mechanisms for reciprocating the transfer mechanisms such that the travel of one transfer mechanism varies approximately in accordance with the sine of the angular displacement of the drive means from said initial position and the travel of the other transfer mechanism is approximately one quarter cycle out of phase with said one transfer mechanism.

5. In a packaging apparatus having a filling station, a transfer means for advancing containers along a path past the filling station, said transfer means including a main and an auxiliary transfer mechanism mounted for reciprocation in a direction generally paralleling said path, said main transfer mechanism including first and second sections movable in unison with each other in first and second zones spaced apart in a direction lengthwise of said path, said auxiliary transfer mechanism being mounted for reciprocation in a third zone adjacent said filling station and between said first and second zones for moving containers past the filling station, said main and auxiliary transfer mechanisms having container engaging fingers for engaging and advancing a container therewith when the transfer mechanisms are moved in a forward direction and for by-passing the containers when the transfer mechanisms are moved in a rearward direction, and drive means for cyclically reciprocating said first and second transfer mechanisms out of phase with each other.

6. In a packaging apparatus having a filling station, a transfer means for advancing containers along a path past the filling station, said transfer means including a main and an auxiliary transfer mechanism mounted for reciprocation in a direction generally paralleling said path, said main transfer mechanism including first and second sections movable in unison with each other in first and second zones spaced apart in a direction lengthwise of said path, said auxiliary transfer mechanism being mounted for reciprocation in a third zone adjacent said filling station and between said first and second zones for moving containers past the filling station, said main and auxiliary transfer mechanisms having container engaging fingers for engaging and advancing a container therewith when the transfer mechanisms are moved in a forward direction and for by-passing the containers when the transfer mechanisms are moved in a rearward direction, said main and auxiliary transfer mechanisms each having a normal rest position, drive means for reciprocating said main and auxiliary transfer mechanisms from their respective rest positions through a cycle and back to their rest positions, said drive means including means operative to produce an initial rapid movement of said auxiliary transfer mechanism in said forward direction across the filling station to rapidly move the containers thereat, said drive means including means operative to produce movement of said main transfer mechanism which is initially relatively slower than said initial movement of the auxiliary transfer mechanism.

7. In a packaging apparatus having a filling station, a transfer means for advancing containers along a path past the filling station, said transfer means including a main and an auxiliary transfer mechanism mounted for reciprocation in a direction generally paralleling said path, said main transfer mechanism including first and second sections movable in unison with each other in first and second zones spaced apart in a direction lengthwise of said path, said auxiliary transfer mechanism being mounted for reciprocation in a third zone adjacent said filling station and between said first and second zones for moving containers past the filling station, said main and auxiliary transfer mechanisms having container engaging fingers for engaging and advancing a container therewith when the transfer mechanisms are moved in a forward direction and for by-passing the containers when the transfer mechanisms are moved in a rearward direction, said main and auxiliary transfer mechanisms each having a normal rest position, drive means for reciprocating said main and auxiliary transfer mechanisms from their respective rest positions through a cycle and back to their rest positions, said drive means including means operative to initially move said main and auxiliary transfer mechanisms in relatively opposite directions.

8. In a packaging apparatus having a filling station, a transfer means for advancing containers along a path past the filling station, said transfer means including a main and an auxiliary transfer mechanism mounted for reciprocation in a direction generally paralleling said path, said main transfer mechanism including first and second sections movable in unison with each other in first and second zones spaced apart in a direction lengthwise of said path, said auxiliary transfer mechanism being mounted for reciprocation in a third zone adjacent said filling station and between said first and second zones for moving containers past the filling station, said main and auxiliary transfer mechanisms having container engaging fingers for engaging and advancing a container therewith when the transfer mechanisms are moved in a forward direction and for by-passing the containers when the transfer mechanisms are moved in a rearward direction, transfer drive means, means for intermittently rotating said drive means from an initial position through one revolution and back to the initial position, means operatively connecting the drive means to said main and auxiliary transfer mechanisms for reciprocating the transfer mechanisms such that the travel of said auxiliary transfer mechanisms vary approximately in accordance with the sine of the angular displacement of the drive means from said initial position and the travel of said main transfer mechanism is approximately one quarter cycle out of phase with said auxiliary transfer mechanism.

9. In a packaging apparatus having a filling station, a transfer means for advancing containers along a path past the filling station, said transfer means including a main and an auxiliary transfer mechanism mounted for reciprocation in a direction generally paralleling said path, said main transfer mechanism including first and second sections movable in unison with each other in first and second zones spaced apart in a direction lengthwise of said path, said auxiliary transfer mechanism being mounted for reciprocation in a third zone adjacent said filling station and between said first and second zones for moving containers past the filling station, said main and auxiliary transfer mechanisms having container engaging fingers for engaging and advancing a container therewith when the transfer mechanisms are moved in a forward direction and for by-passing the containers when the transfer mechanisms are moved in a rearward direction, transfer drive means, means for intermittently rotating said drive means from an initial position through one revolution and back to the initial position, means operatively connecting the drive means to the auxiliary transfer mechanism for reciprocating the same such that it initially moves forwardly and its travel varies approximately in accordance with the sine of the angular displacement of the drive means from said initial position, and means operatively connecting the drive means to said main transfer mechanism for reciprocating the same such that it initially moves rearwardly and its travel varies approximately in accordance with the cosine of the angular displacement of the drive means from said initial position.

10. The combination of claim 9 wherein the path of travel of at least one container engaging finger on the auxiliary transfer mechanism overlaps the path of travel of at least one finger on the first section of the main transfer mechanism during a portion of the final one-quarter revolution of the drive means and the main and auxiliary transfer mechanisms are both moving forwardly during said final one-quarter revolution but at relatively different speeds whereby forward movement of the containers is uninterrupted during transfer from the first section of the main transfer mechanism to the auxiliary transfer mechanism.

11. In an apparatus for filling containers including a frame having a filling station, a downwardly opening nozzle at the filling station for continuously dispensing a stream of plastic material, transfer means for advancing containers along a path below the nozzle, elevator means at the filling station for elevating the container into position around the nozzle, said transfer means including an auxiliary transfer mechanism mounted for reciprocation in a direction generally paralleling said path in an intermediate zone below said nozzle, said auxiliary transfer mechanism having container engaging fingers for engaging containers when the auxiliary transfer mechanism is moved forward to advance an empty container into position below the nozzle and advance a filled container out of position below the nozzle, said transfer means including a main transfer mechanism having infeed and outfeed sections mounted for reciprocation in unison in a direction generally paralleling said path, said infeed section being movable in an infeed zone adjoining one end of said intermediate zone and said outfeed section being movable in an outfeed zone adjoining the other end of said intermediate zone, said infeed and outfeed sections each having container engaging means thereon for respectively advancing empty containers to the intermediate zone and filled containers from the intermediate zone when the main transfer mechanism is moved forward, a drive means for cyclically reciprocating said main and auxiliary transfer mechanisms out of phase with each other, and means for operating said elevator means in timed relation with said auxiliary transfer mechanism.

12. The combination of claim 11 wherein said main and auxiliary transfer mechanisms are reciprocated approximately one-quarter cycle out of phase with each other.

13. The combination of claim 11 wherein the container engaging means on the auxiliary transfer mechanism includes first and second container engaging fingers spaced apart lengthwise of said path a distance greater than the width of a container measured lengthwise of said path and respectively arranged to move an empty container into position below the nozzle and a filled container out of position below the nozzle.

14. In an apparatus for filling containers including a frame having a filling station, a downwardly opening nozzle at the filling station for continuously dispensing a stream of plastic material, transfer means for advancing containers along a path below the nozzle, elevator means at the filling station for elevating the container into position around the nozzle, said transfer means including an auxiliary transfer mechanism mounted for reciprocation in a direction generally paralleling said path in an intermediate zone below said nozzle, said auxiliary transfer mechanism having container engaging fingers for engaging containers when the auxiliary transfer mechanism is moved forward to advance an empty container into position below the nozzle and advance a filled container out of position below the nozzle, said transfer mechanism having infeed and outfeed sections mounted for reciprocation in unison in a direction generally paralleling said path, said infeed section being movable in an infeed zone adjoining one end of said intermediate zone and said outfeed section being movable in an outfeed zone adjoining the other end of said intermediate zone, said infeed and outfeed sections each having container engaging means thereon for respectively advancing empty containers to the intermediate zone and filled containers from the intermediate zone when the main transfer mechanism is moved forward, transfer drive means, means operatively connecting the main and auxiliary transfer mechanisms to the drive means for reciprocating the same such that the travel of the auxiliary transfer mechanism varies approximately in accordance with the sine of the angular displacement of the drive means from said initial position and the travel of the main transfer mechanism is approximately one-quarter cycle out of phase with said auxiliary transfer mechanism.

15. In an apparatus for filling containers including a frame having a filling station, a downwardly opening nozzle at the filling station for continuously dispensing a stream of plastic material, transfer means for advancing containers along a path below the nozzle, elevator means at the filling station for elevating the container into position around the nozzle, said transfer means including an auxiliary transfer mechanism mounted for reciprocation in a direction generally paralleling said path in an intermediate zone below said nozzle, said auxiliary transfer mechanism having container engaging fingers for engaging containers when the auxiliary transfer mechanism is moved forward to advance an empty container into position below the nozzle and advance a filled container out of position below the nozzle, and transfer means including a main transfer mechanism having infeed and outfeed sections mounted for reciprocation in unison in a direction generally paralleling said path, said infeed section being movable in an infeed zone adjoining one end of said intermediate zone and said outfeed section being movable in an outfeed zone adjoining the other end of said intermediate zone, said infeed and outfeed sections each having container engaging means thereon for respectively advancing empty containers to the intermediate zone when the main transfer mechanism is moved forward, transfer drive means including a crank, means responsive to the filling of a container at the filling station for driving said crank from an initial position through one revolution, first and second linkage means operatively connected to said crank and to said auxiliary and main transfer mechanisms respectively for reciprocating the same in response to rotation of said crank, said first and second linkage means respectively including first and second levers pivotally mounted on said frame for oscillating about first and second axes disposed at different angular positions relative to said initial position of said crank to reciprocate said auxiliary and main transfer mechanisms out of phase with each other.

16. The combination of claim 15 wherein linkage means is arranged to reciprocate said main and auxiliary transfer mechanisms through substantially equal strokes.

17. The combination of claim 15 wherein said means for operating said elevator means includes a cam mounted for turning with said crank, said cam follower means operatively connecting said cam to said elevator means.

18. In an apparatus for filling containers including a downwardly opening dispensing nozzle for continuously dispensing a stream of plastic material, transfer means for advancing containers along a path crosswise of the nozzle to feed empty containers to a filling station below the nozzle and for moving filled containers away from the filling station, infeed container guide means supporting the empty containers with their upper edges spaced below the lower end of the nozzle as the containers are advanced by the transfer means to the nozzle to provide clearance between the top of the container and the material emerging from the nozzle, an elevator at the filling station, drive means for operating said elevator and said transfer means in timed relation, said drive means including a transfer drive member and a cam means, means responsive to filling of a container at the filling station for rotating said transfer drive member and said cam means from an initial position through one revolution and back to said initial position, means operatively connecting said transfer drive member to said transfer means to move a filled carton crosswise of the nozzle, spring means engaging said elevator to yieldably oppose downward movement of the elevator and the container thereon during filling of the container, cam follower means operatively connected to said elevator, said cam means including a first cam portion for engaging said follower during one portion of the revolution of said cam means and shaped to limit downward movement of the elevator to a level spaced below the nozzle a distance substantially equal to the height of a container while permitting downward movement of the elevator above said level to be controlled by said spring means, said cam means including a second cam portion engaging said follower during a second portion of the revolution of the cam means to positively lower the elevator to a level at least as low as said infeed guide means to allow a succeeding container to move into position on the elevator, and said cam means including a third cam portion engageable with said follower during a third portion of the revolution of the cam means to positively raise the elevator to move the container into telescoping relation with the nozzle.

19. In a packaging machine for handling cartons of the type having spaced side and end walls and closure flaps on the ends of at least some of the walls, the combination of a support frame, a carton transfer mechanism for intermittently advancing the cartons in one direction along a path with one side wall and its flap at the trailing side of the carton, means for folding the flap on the trailing wall of the carton comprising an elongated arm, means supporting the arm at one end thereof for swinging movement about an axis oblique to said path between a first position extending generally crosswise of the path and a second position extending from said one end of the arm in a direction opposite said one direction and generally lengthwise of said path adjacent one side thereof, and means for swinging said arm about said axis.

20. In a packaging machine for handling cartons of the type having spaced side and end walls and closure flaps on the ends of at least some of the walls, the combination of a support frame, a carton transfer mechanism for intermittently advancing the cartons in one direction along a path with one side wall and its flap at the trailing side of the carton, means for folding the flap on the trailing wall of the carton comprising an elongated arm, means supporting said arm at one end for swinging movement in a generally semi-conical path between a first position extending generally crosswise of the path and a second position extending from said one end of the arm in a direction opposite said one direction and generally lengthwise of said path at one side thereof, and means for swinging said arm about said axis.

21. In a packaging machine for cartons of the type having spaced side and end walls and closure flaps on the upper ends of at least some of the walls, the combination of a support frame, a carton transfer mechanism for intermittently advancing cartons in one direction along a path with one side wall and its flap at the trailing side of the carton, means for folding the flap on the trailing wall of the carton comprising an elongated arm, arm mounting means connected to the end of said arm and defining a pivot axis for said arm, said arm diverging relative to said pivot axis at an angle of no more than 45°, means supporting said arm mounting means on said frame with said pivot axis extending oblique to said path at an angle such that the arm is swingable between a first position extending generally crosswise of said path and a second position in which the arm extends from said one end in a direction opposite said one direction and generally lengthwise of said path adjacent one side thereof, and means for swinging said arm about said pivot axis.

22. The combination of claim 21 wherein said pivot axis of said arm mounting means is inclined to a vertical plane paralleling said path at an angle which is approximately the complement of the angle of divergence between the arm and its pivot axis so that the arm extends at approximately right angles to said path when the arm is in said first position.

23. The combination of claim 21 wherein said pivot axis of said arm mounting means is inclined upwardly from said one end relative to a horizontal plane paralleling the tops of the cartons at an angle substantially less than the angle of divergence between the arm and its pivot axis.

24. In a packaging machine for handling cartons of the type having spaced side and end walls and closure flaps on the ends of at least some of the walls, the combination of a support frame, a carton transfer mechanism for intermittently advancing the cartons in one direction along a path with one side wall and its flap at the trailing side of the carton, means for folding the flap on the trailing wall of the carton comprising an elongated arm, arm mounting means connected to one end of said arm and defining a pivot axis for said arm, said arm diverging relative to said pivot axis at an acute angle, said pivot axis being inclined from said one end away from a vertical plane paralleling said path at an angle which is approximately the complement of the angle of divergence between the arm and its pivot axis and such that the arm is swingable about said pivot axis between a first position extending generally crosswise of said path and a second position in which the arm extends from said one end in a direction opposite said one direction and generally lengthwise of said path adjacent one side thereof, said pivot axis being inclined upwardly from said one end relative to a horizontal plane paralleling the tops of the cartons at an angle of about 20 degrees.

25. In a packaging machine for handling cartons of the type having spaced side and end walls and closure flaps on the ends of at least some of the walls, the combination of a support frame, a carton transfer mechanism for intermittently advancing the cartons in one direction along a path with one side wall and its flap at the trailing side of the carton, means for folding the flap on the trailing wall of the carton comprising an elongated arm, means supporting the arm at one end thereof for swinging movement about an axis oblique to said path between a first position extending generally crosswise of the path and a second position extending from said one end of the arm in a direction opposite said one direction and generally lengthwise of said path adjacent one side thereof, means for operating said transfer mechanism and for swinging said arm in timed relation with each other to swing said arm from said second position to said first position while the cartons are stationary and to swing said arm from said first position back to said second position while the transfer mechanism advances the cartons past said flap folding means.

26. In a packaging machine for handling cartons of the type having spaced side and end walls and closure flaps on the ends of at least some of the walls, the combination of a support frame, a reciprocable carton transfer mechanism operable when extended to advance cartons in one direction along a path with one side wall and its flap at the trailing side of the carton and operable when retracted to by-pass the cartons whereby the cartons remain stationary during retraction of the transfer mechanism, means for folding the flap on the trailing wall of the carton comprising an elongated arm, means supporting the arm at one end for swinging movement about an axis oblique to said path between a first position extending generally crosswise of the path and a second position extending from said one end of the arm in a direction opposite said one direction and generally lengthwise of said path adjacent one side thereof, and means for reciprocating said transfer mechanism and for swinging said arm in timed relation to swing said arm from said second position to said first position while the transfer mechanism is retracting and to swing said arm from said second position back to said first position while the transfer mechanism is being extended.

References Cited

UNITED STATES PATENTS 3,216,175  11/1965  Stohlquist _____ 53—186

GRANVILLE Y. CUSTER, Jr., *Primary Examiner.*